US011982753B2

(12) United States Patent
Faragher et al.

(10) Patent No.: US 11,982,753 B2
(45) Date of Patent: May 14, 2024

(54) METHOD AND SYSTEM FOR CALIBRATING A SYSTEM PARAMETER

(71) Applicant: Focal Point Positioning Limited, Cambridge (GB)

(72) Inventors: Ramsey Faragher, Cambridge (GB); Nicolas Couronneau, Bristol (GB); Robert Mark Crockett, Hertfordshire (GB)

(73) Assignee: FOCAL POINT POSITIONING LIMITED, Cambridge (GB)

( * ) Notice: Subject to any disclaimer, the term of this patent is extended or adjusted under 35 U.S.C. 154(b) by 115 days.

(21) Appl. No.: 17/744,863

(22) Filed: May 16, 2022

(65) Prior Publication Data

US 2022/0283322 A1 Sep. 8, 2022

Related U.S. Application Data

(63) Continuation of application No. 16/823,973, filed on Mar. 19, 2020, now Pat. No. 11,808,865, which is a (Continued)

(30) Foreign Application Priority Data

Sep. 26, 2017 (GB) ...................................... 1715573

(51) Int. Cl.
*G01S 19/47* (2010.01)
*G01S 19/23* (2010.01)

(52) U.S. Cl.
CPC .............. *G01S 19/47* (2013.01); *G01S 19/23* (2013.01)

(58) Field of Classification Search
CPC .......... G01S 19/55; G01S 19/44; G01S 19/21; G01S 19/43; G01S 19/23; G01S 19/235
(Continued)

(56) References Cited

U.S. PATENT DOCUMENTS 4,580,224 A 4/1986 Gerber
4,618,930 A 10/1986 Ueno et al.
(Continued)

FOREIGN PATENT DOCUMENTS

GB 2509343 A 7/2014
GB 2548620 A 9/2017
(Continued)

OTHER PUBLICATIONS

Broumandan et al., "Direction of Arrival Estimation of GNSS Signals Based on Synthetic Antenna Array," 2007 Institute of Navigation (ION) Global Navigation Satellite System (GNSS) Conference, Sep. 2007, 11 pages.
(Continued)

*Primary Examiner* — Vladimir Magloire
*Assistant Examiner* — Michael W Justice
(74) *Attorney, Agent, or Firm* — Moser Taboada

(57) ABSTRACT

A method for performing in a positioning, navigation, tracking, frequency-measuring, or timing system is provided. The method comprises: providing first and second estimates of at least one system parameter during a first time period, wherein the at least one system parameter has a true value and/or true evolution over time during the first time period; providing a local signal; receiving, at a receiver, a signal from a remote source; providing a correlation signal by correlating the local signal with the received signal; providing amplitude and/or phase compensation of at least one of the local signal, the received signal and the correlation signal based on each of the first and second estimates so as to provide first and second amplitude-compensated and/or phase-compensated correlation signals corresponding to the first and second estimates of the at least one system parameter during the first time period, and; determining which of the first and second estimates is nearer the true value and/or
(Continued)

true evolution over time of the at least one system parameter during the first time period, based on a comparison between the first and second amplitude-compensated and/or phase-compensated correlation signals. A computer readable medium and system are also disclosed.

18 Claims, 7 Drawing Sheets

Related U.S. Application Data continuation of application No. PCT/GB2018/052716, filed on Sep. 25, 2018.

(58) Field of Classification Search
USPC .................................. 342/357.62, 108, 150
See application file for complete search history.

(56) References Cited

U.S. PATENT DOCUMENTS

| | | | |
|---|---|---|---|
| 5,079,553 A | 1/1992 | Orr | |
| 5,893,044 A | 4/1999 | King et al. | |
| 6,031,882 A | 2/2000 | Enge et al. | |
| 6,140,568 A * | 10/2000 | Kohler | G10H 3/125 |
| | | | 84/654 |
| 6,297,771 B1 * | 10/2001 | Gronemeyer | G01S 19/29 |
| | | | 342/357.62 |
| 6,496,145 B2 * | 12/2002 | Gronemeyer | G01S 19/29 |
| | | | 342/357.62 |
| 6,556,688 B1 | 4/2003 | Ratnakar | |
| 6,577,271 B1 * | 6/2003 | Gronemeyer | G01S 19/30 |
| | | | 342/357.62 |
| 6,639,541 B1 | 10/2003 | Quintana et al. | |
| 6,661,371 B2 | 12/2003 | King et al. | |
| 6,718,174 B2 * | 4/2004 | Vayanos | G01S 11/10 |
| | | | 342/357.66 |
| 6,793,390 B2 * | 9/2004 | Wang | G06T 3/0075 |
| | | | 378/174 |
| 6,850,557 B1 * | 2/2005 | Gronemeyer | H04B 1/707 |
| | | | 375/150 |
| 6,917,331 B2 * | 7/2005 | Gronemeyer | G01S 19/30 |
| | | | 342/357.62 |
| 6,917,654 B1 | 7/2005 | Cerda | |
| 6,922,546 B1 | 7/2005 | Da et al. | |
| 6,931,055 B1 * | 8/2005 | Underbrink | H04B 1/707 |
| | | | 375/150 |
| 7,030,814 B2 | 4/2006 | Stone et al. | |
| 7,161,977 B1 * | 1/2007 | Jung | H04B 1/70755 |
| | | | 375/150 |
| 7,359,719 B1 | 4/2008 | Duffett-Smith et al. | |
| 7,365,679 B2 * | 4/2008 | Murakami | G01S 19/30 |
| | | | 342/357.68 |
| 7,411,996 B2 * | 8/2008 | Kim | H04B 1/70752 |
| | | | 375/150 |
| 7,440,493 B2 | 10/2008 | Pietilä et al. | |
| 7,453,956 B2 * | 11/2008 | Camp, Jr. | G01S 19/29 |
| | | | 375/324 |
| 7,453,961 B1 | 11/2008 | Li et al. | |
| 7,570,206 B2 * | 8/2009 | Uchida | G01S 19/29 |
| | | | 342/357.69 |
| 7,579,984 B2 | 8/2009 | Wang et al. | |
| 7,760,138 B2 | 7/2010 | Martin et al. | |
| 7,830,951 B2 | 11/2010 | Jia | |
| 7,907,679 B2 * | 3/2011 | Kleider | H04L 25/4902 |
| | | | 375/343 |
| 7,929,928 B2 | 4/2011 | Babitch et al. | |
| 8,013,789 B2 | 9/2011 | Graas et al. | |
| 8,044,857 B2 | 10/2011 | Maenpa et al. | |
| 8,089,402 B2 | 1/2012 | Maenpa et al. | |
| 8,134,499 B2 | 3/2012 | Wang et al. | |
| 8,154,445 B2 | 4/2012 | Maenpa et al. | |
| 8,238,490 B2 * | 8/2012 | Yeh | H04L 27/0014 |
| | | | 370/514 |
| 8,270,457 B2 * | 9/2012 | Sun | G01S 19/30 |
| | | | 375/150 |
| 8,406,280 B2 | 3/2013 | Draganov et al. | |
| 8,442,095 B2 * | 5/2013 | Ahmed | H04B 1/7077 |
| | | | 375/150 |
| 8,457,177 B2 | 6/2013 | Sullivan | |
| 8,509,362 B2 * | 8/2013 | Sun | G01S 19/24 |
| | | | 375/150 |
| 8,514,912 B2 * | 8/2013 | Shirai | H04B 1/7075 |
| | | | 375/150 |
| 8,525,727 B2 * | 9/2013 | Roh | G01S 19/22 |
| | | | 342/357.77 |
| 8,542,718 B2 | 9/2013 | Weill | |
| 8,755,472 B2 * | 6/2014 | Sun | H04L 7/0016 |
| | | | 375/376 |
| 9,128,182 B2 * | 9/2015 | Kishigami | G01S 13/44 |
| 9,223,028 B2 | 12/2015 | Sullivan | |
| 9,231,652 B2 * | 1/2016 | Osugi | G01S 19/30 |
| 9,304,184 B1 | 4/2016 | Draganov et al. | |
| 9,320,003 B2 * | 4/2016 | Jin | H04L 27/2675 |
| 9,658,341 B2 | 5/2017 | Mathews et al. | |
| 9,780,829 B1 | 10/2017 | Faragher et al. | |
| 9,797,732 B2 * | 10/2017 | Li | G01C 21/005 |
| 9,989,646 B2 * | 6/2018 | Margaria | G01S 19/23 |
| 10,018,474 B2 * | 7/2018 | Li | G01C 21/34 |
| 10,091,754 B2 | 10/2018 | Miller et al. | |
| 10,257,776 B2 * | 4/2019 | Kuchi | H04W 56/001 |
| 10,321,430 B2 | 6/2019 | Faragher et al. | |
| 10,330,791 B2 | 6/2019 | Revol | |
| 10,466,337 B2 | 11/2019 | Amizur et al. | |
| 11,137,500 B2 | 10/2021 | Faragher et al. | |
| 11,187,810 B2 * | 11/2021 | Cheng | G01S 19/235 |
| 2002/0012308 A1 | 1/2002 | Tonami | |
| 2002/0015439 A1 | 2/2002 | Kohli et al. | |
| 2002/0036588 A1 * | 3/2002 | Gronemeyer | G01S 19/30 |
| | | | 342/378 |
| 2002/0080070 A1 | 6/2002 | Harles et al. | |
| 2002/0146065 A1 | 10/2002 | Kohli et al. | |
| 2002/0177450 A1 * | 11/2002 | Vayanos | G01S 11/10 |
| | | | 455/456.1 |
| 2003/0067970 A1 * | 4/2003 | Kim | H04B 1/70752 |
| | | | 375/150 |
| 2003/0164200 A1 | 9/2003 | Czeranna et al. | |
| 2003/0201935 A1 | 10/2003 | King et al. | |
| 2003/0214434 A1 * | 11/2003 | Gronemeyer | G01S 19/29 |
| | | | 342/378 |
| 2004/0071269 A1 * | 4/2004 | Wang | G06T 7/32 |
| | | | 378/174 |
| 2004/0150557 A1 | 8/2004 | Ford et al. | |
| 2005/0114023 A1 | 5/2005 | Williamson et al. | |
| 2006/0034393 A1 * | 2/2006 | Camp, Jr. | G01S 19/29 |
| | | | 375/340 |
| 2006/0071851 A1 | 4/2006 | Graas et al. | |
| 2006/0074558 A1 | 4/2006 | Williamson et al. | |
| 2007/0118286 A1 | 5/2007 | Wang et al. | |
| 2007/0262898 A1 * | 11/2007 | Murakami | G01S 19/30 |
| | | | 342/357.68 |
| 2008/0068263 A1 | 3/2008 | Tekawy et al. | |
| 2008/0133135 A1 | 6/2008 | Diesposti et al. | |
| 2008/0170645 A1 * | 7/2008 | Kleider | H04L 25/4902 |
| | | | 375/343 |
| 2008/0238772 A1 | 10/2008 | Soloviev et al. | |
| 2008/0240309 A1 | 10/2008 | Jia | |
| 2009/0079627 A1 * | 3/2009 | Sun | G01S 19/36 |
| | | | 342/357.77 |
| 2009/0219201 A1 | 9/2009 | Martin et al. | |
| 2009/0310654 A1 * | 12/2009 | Ahmed | G01S 19/30 |
| | | | 375/150 |
| 2009/0310655 A1 * | 12/2009 | Shirai | H04B 1/7075 |
| | | | 375/150 |
| 2010/0117884 A1 | 5/2010 | Ahmed et al. | |
| 2010/0214172 A1 * | 8/2010 | Yeh | H04L 27/0014 |
| | | | 342/378 |
| 2010/0304761 A1 | 12/2010 | Seibert et al. | |
| 2011/0050489 A1 | 3/2011 | Maenpa et al. | |
| 2011/0050497 A1 | 3/2011 | Maenpa et al. | |

(56) References Cited

U.S. PATENT DOCUMENTS

| | | | |
|---|---|---|---|
| 2011/0156954 A1* | 6/2011 | Roh | G01S 19/40 |
| | | | 342/357.69 |
| 2011/0169689 A1 | 7/2011 | Wang et al. | |
| 2011/0206090 A1 | 8/2011 | Kubrak et al. | |
| 2011/0241939 A1 | 10/2011 | Maenpa et al. | |
| 2012/0050103 A1 | 3/2012 | Revol | |
| 2012/0056781 A1* | 3/2012 | Kong | G01S 19/256 |
| | | | 342/357.42 |
| 2012/0281734 A1* | 11/2012 | Sun | G01S 19/36 |
| | | | 375/E1.003 |
| 2013/0127655 A1* | 5/2013 | Kishigami | G01S 13/42 |
| | | | 342/152 |
| 2013/0137468 A1 | 5/2013 | Kahle et al. | |
| 2013/0257653 A1 | 10/2013 | Sullivan | |
| 2013/0294549 A1* | 11/2013 | Sun | G01S 19/37 |
| | | | 375/376 |
| 2014/0062781 A1 | 3/2014 | Mathews et al. | |
| 2014/0340258 A1 | 11/2014 | Nagano | |
| 2015/0049789 A1* | 2/2015 | Osugi | G01S 19/21 |
| | | | 375/137 |
| 2015/0146712 A1* | 5/2015 | Jin | H04L 27/2675 |
| | | | 370/350 |
| 2016/0033649 A1 | 2/2016 | Mathews et al. | |
| 2016/0069690 A1* | 3/2016 | Li | G01C 21/206 |
| | | | 701/411 |
| 2016/0170027 A1* | 6/2016 | Margaria | G01S 19/23 |
| | | | 342/357.61 |
| 2017/0176191 A1* | 6/2017 | Li | G01S 19/01 |
| 2018/0077630 A1* | 3/2018 | Kuchi | H04W 48/16 |
| 2020/0041656 A1* | 2/2020 | Cheng | G01S 19/23 |
| 2020/0264317 A1 | 8/2020 | Faragher et al. | |

FOREIGN PATENT DOCUMENTS

| | | | |
|---|---|---|---|
| JP | 2008107160 A | | 5/2008 |
| WO | 0049695 A1 | | 8/2000 |
| WO | 2006137904 A2 | | 12/2006 |
| WO | 2015015422 A1 | | 2/2015 |
| WO | 2018177555 A1 | | 10/2018 |

OTHER PUBLICATIONS

International Preliminary Report on Patentability in International Application No. PCT/GB2017/050777 dated May 25, 2018, 17 pages.
International Search Report and Written Opinion in International Patent Application No. PCT/GB2017/050777 dated May 30, 2017, 12 pages.
International Search Report and Written Opinion in International Patent Application No. PCT/GB2017/050778 dated May 30, 2017, 12 pages.
International Search Report and Written Opinion in International Patent Application No. PCT/GB2018/052716 dated Dec. 19, 2018, 15 pages.
Kubrak D., et al., "Performance Analysis of MEMS Based Pedestrian Navigation Systems," ION GNSS 18th International Technical Meeting of the Satellite Division, Sep. 2005, pp. 2976-2986.
Niedermeier H., et al., "DINGPOS: High Sensitivity GNSS Platform for Deep Indoor Scenarios," 2010 International Conference on Indoor Positioning and Indoor Navigation (IPIN), Sep. 2010, 11 pages.
Office Action in United Kingdom Patent Application No. GB1715573.0 dated Jan. 15, 2018, 5 pages.
Pany et al., "Coherent Integration Time: The Longer, the Better," InsideGNSS, Nov./Dec. 2000, pp. 52-61.
United Kingdom Intellectual Property Office, Combined Search and Examination Report under Section 17 & 18(3)—Application No. GB1605044.5, dated May 5, 2016, 7 pages.

* cited by examiner

METHOD AND SYSTEM FOR CALIBRATING A SYSTEM PARAMETER

CROSS-REFERENCE TO RELATED APPLICATIONS

This application is a continuation of U.S. application Ser. No. 16/823,973, filed on Mar. 19, 2020, which is a bypass continuation of International Application No. PCT/GB2018/052716, filed on Sep. 25, 2018, which in turn claims priority to GB Application No. 1715573.0, filed on Sep. 26, 2017. Each of these applications is incorporated herein by reference in its entirety.

FIELD

The present invention is directed to a method and system for calibrating a system parameter, and has particular application to positioning, tracking, navigation, frequency-measuring and timing systems.

BACKGROUND

In a standard Global Navigation Satellite System (GNSS) procedure, a receiver receives a signal broadcast from a remote source, such as a satellite, and correlates it with a locally-produced signal in order to provide a correlation code such that the receiver may synchronise with the received signal. Examples of such received signals include GPS signals, which include Gold Codes encoded within the radio transmission, and GLONASS signals.

Noise may be introduced into the received signal, for example via the communications channel through which it is received, or phase changes in the received signal caused by multi-path effects. As the signal to noise ratio of the received signal decreases, it becomes more difficult to perform accurate correlation of the local signal and the received signal.

It is therefore desirable to provide an improved approach for correlating a local signal with a received signal.

SUMMARY

In accordance with a first aspect of the invention there is provided a method for performing in a positioning, navigation, tracking, frequency-measuring, or timing system, comprising: providing first and second estimates of at least one system parameter during a first time period, wherein the at least one system parameter has a true value and/or true evolution over time during the first time period; providing a local signal; receiving, at a receiver, a signal from a remote source; providing a correlation signal by correlating the local signal with the received signal; providing amplitude and/or phase compensation of at least one of the local signal, the received signal and the correlation signal based on each of the first and second estimates so as to provide first and second amplitude-compensated and/or phase-compensated correlation signals corresponding to the first and second estimates of the at least one system parameter during the first time period, and; determining which of the first and second estimates is nearer the true value and/or true evolution over time of the at least one system parameter during the first time period, based on a comparison between the first and second amplitude-compensated and/or phase-compensated correlation signals.

The inventors have advantageously realised that correlation of the local signal with the received signal may be optimised while simultaneously calibrating one or more parameters of the system. This is achieved by providing first and second phase-compensated and/or amplitude-compensated correlation signals, comparing the signals and typically selecting the compensated correlation signal having the higher correlation or the more-likely evolution over time. The selection thus made not only provides an improvement in the correlation of the local signal and the received signal, but also implies that the estimate of the system parameter associated with the compensated correlation signal having the higher correlation or the more-likely evolution over time is nearer the true value and/or true evolution over time of the system parameter.

Indeed, conventionally, phase and amplitude changes in the received signal (for example caused by changes in the line-of-sight path between the receiver and the remote source) were viewed as a nuisance that reduced positioning accuracy. In the present invention, these amplitude and/or phase changes in the received signal, embodied as an amplitude and/or phase evolution over the first time period, are used advantageously in order to "test" different amplitude and/or phase compensations based on different estimates of at least one system parameter in order to determine which estimate is nearer the true value and/or evolution over time. Examples of system parameters which may be tested in this fashion include position, speed, orientation, heading (direction of motion), local-oscillator frequency error, magnetometer bias error, gyroscope drift rate, accelerometer drift rate, and other parameters such as would occur to one skilled in the art.

It is envisaged that more than two estimates of a system parameter may be provided and "tested" using associated amplitude and/or phase compensation. It is also envisaged that two or more system parameters may be calibrated substantially simultaneously, by providing first and second (and possibly further) estimates of each system parameter.

Phase and/or amplitude compensation can be applied to the received signal, the local signal, or a combination thereof before the signals are correlated. The phase and/or amplitude compensation may also be applied after correlation. In an advantageous embodiment, the compensation may be applied partially to two or all three of the local signal, received signal and correlation signal. For example, compensation corresponding to an estimate of a local-oscillator frequency error may be applied to the received signal, whilst simultaneously applying compensation to the local signal corresponding to an estimate of the receiver velocity.

Particularly advantageously, phase-compensation enables correlation using much longer coherent integration times (typically one second duration or greater) than is possible using conventional processing (typically twenty milliseconds or less in the case of GPS). Long coherent integration times may boost the received signal-to-noise ratio of otherwise very weak signals, allowing the present invention to be used, for example, in conjunction with attenuated GNSS signals in difficult environments (such as indoors or in urban canyons). Furthermore, the increased correlation time results in an increased resolution in frequency space by which the present invention may better discriminate between different phase compensations, and, by extension, between different estimates of one or more system parameters. The frequency resolution is inversely proportional to the coherent integration time.

A received signal may include any known or unknown pattern of transmitted information, either digital or analogue, that can be found within a broadcast signal by a cross-correlation process using a local copy of the same pattern. The received signal may be encoded with a chipping code that can be used for ranging. Examples of such received signals include GPS signals, which include Gold Codes encoded within the radio transmission. Another example is the Extended Training Sequences used in GSM cellular transmissions.

In practice the received signal may be processed as a complex code, including in-phase and quadrature components. The local signal may be similarly complex. The correlation signal can be used as a measure of the correlation between these complex signals.

The first time period is the time period over which correlation is performed.

Typically, the first and second estimates of the at least one system parameter are used to provide respective first and second predictions of the phase and/or amplitude evolution of the received signal from the remote source during the first time period, and wherein the amplitude and/or phase compensation is performed based on said first and second predictions.

The estimates of the system parameter may be used in combination with a mathematical model to provide the respective predictions of the phase and/or amplitude evolution of the received signal during the first time period. The model is typically pre-selected for each system parameter. Typically a predicted phase evolution during the first time period is derived from a predicted frequency evolution of the received signal during the first time period. Different estimates of the system parameter will give rise to different predictions of the phase and/or amplitude evolution of the received signal during the first time period, thereby meaning that the amplitude and/or phase compensation performed is different for different estimates of the at least one system parameter. By comparing the correlation signals obtained as a result of the amplitude and/or phase compensation, the estimate that is nearer the true value and/or true evolution with time can be selected.

The method may further comprise the step of providing a third estimate of the at least one system parameter during the first time period, wherein the third estimate is based upon the determination of which of the first and second estimates was nearer the true value and/or true evolution over time of the at least one system parameter during the first time period. In this manner an iterative approach may be used in which adjustments to the tested estimates are made until the optimum estimate has been reached.

As an example, suppose the system parameter that we wish to calibrate is the direction-of-motion of the receiver. In this example we will suppose that this is constant (i.e. time-independent) during the first time period, and therefore has a true (although unknown) value. Using the mathematical model, a first estimate of the direction-of-motion will provide a first predicted amplitude and/or phase evolution over the first time period, and a second (different) estimate of the direction-of-motion over the first time period will provide a second predicted amplitude and/or phase evolution over the first time period. By performing amplitude and/or phase compensation of at least one of the local signal, received signal and correlation signal for each of the estimates, and comparing the resulting compensated correlation codes to see which has the higher correlation or the more-likely evolution with time, we can infer which of the two estimates of the direction-of-motion of the receiver was nearer the real value during the first time period. An iterative approach may be used to determine an optimum estimate.

Typically, the amplitude and/or phase compensation is based on a plurality of vectors derived from the first and second predictions of amplitude and/or phase evolution over the first time period. In this context the vectors are like a column matrix, representing a number of values. The plurality of vectors may be a sequence of phase vectors, or phasors, which are 2D phase vectors indicative of the predicted amplitude and/or phase changes introduced into the received signal during the first time period. The plurality of vectors may be combined with the at least one of the local signal, the received signal and the correlation signal in order to provide the amplitude and/or phase compensation. In some instances where there is no amplitude evolution during the first time period the vectors may be unit vectors.

In particularly advantageous embodiments of the invention, the method further comprises the step of providing a measured or assumed movement of the receiver during the first time period, and wherein the amplitude and/or phase compensation is based on the measured or assumed movement of the receiver. Typically the first and second estimates of the at least one system parameter are based on the measured or assumed movement.

Where the first and second estimates are based on a measured movement of the receiver, this is typically provided by at least one sensor configured to make measurements from which position and/or orientation and/or movement may be determined. This may be an inertial measurement unit such as an accelerometer, gyroscope, barometer or magnetometer for example. Other sensors as would be understood by those skilled in the art may be used. The at least one sensor is typically mounted on the receiver.

Preferably, measurements from the at least one sensor are obtained during the first time period to provide a measured movement of the receiver during the first time period, and this measured movement subsequently used to predict an amplitude and/or phase evolution of the received signal during the time period, using at least one of the system parameters. The at least one system parameter may be a parameter of a motion and/or position and/or orientation of the receiver during the first time period. This may be, for example, a velocity of the receiver, obtained by an analysis of the measurements taken by an accelerometer during the first time period using an appropriate physical model for converting the accelerometer measurements into a receiver velocity. First and second estimates of the receiver velocity may then be "tested" using the method of the present invention in order to both optimise the correlation over the first time period, and determine which of the estimates of receiver velocity is nearer the true value and/or evolution over time. The amplitude and/or phase compensation is performed on at least one of the local signal and received signal that were obtained during the first time period. As has been explained above, the amplitude and/or phase compensation may also be applied to the correlation signal, after correlation.

Other examples of system parameters that are parameters of a motion and/or position and/or orientation of the receiver include a receiver position, a receiver orientation, a receiver heading, a receiver heading offset (e.g. offset between the receiver orientation and direction of motion), a step length of a user of the receiver (for example for a dead-reckoning system), and a line-of-sight vector between the receiver and the remote source. In some instances, the parameter may be the angle of arrival of a reflected or refracted signal originating from a remote source. For example, such a signal may have been reflected off a surface, or refracted through an inhomogeneous plasma, located between the remote source and the receiver.

The system parameter may be a bias and/or drift rate of at least one sensor. This is particularly advantageous when the at least one sensor is a low-cost sensor (for example as seen in smart phones) which are typically of low quality and have large inherent biases. For example, first and second estimates of an accelerometer bias may be provided, and amplitude and/or phase compensation performed based on the first and second estimates in order to determine which estimate is closer to the true value and/or evolution with time of the sensor bias.

The system parameter may be a frequency reference error of the receiver or remote source.

The system parameter may be fixed (i.e. has a constant value) during the first time period, or may be time-dependent.

Particularly advantageously, the first and second amplitude-compensated and/or phase-compensated correlation signals may be fully consistent with the physical model used for deriving the system parameters from measurements obtained by the motion sensors during the first time period (which is the time period over which correlation is performed). This is in contrast to state-of-the-art methods that use piece-wise analysis of frequency and time over the correlation time period which might easily lead to an amplitude and/or phase evolution that is inconsistent with a physical model of the receiver motion during the time period. Such an inconsistency would be particularly obvious in cases involving a strong reflected signal (that incorporates a change in phase of the received signal), on to which state-of-the-art methods would lock in preference to a weaker, but more desired, line of sight signal.

Indeed, as well as allowing calibration of at least one system parameter, the use of such a measured or assumed movement of the receiver during the first time period beneficially allows for an increase in positioning, navigation and/or timing accuracy. If phase and/or amplitude compensation is provided in a first direction that extends between the receiver and remote source, it is possible to achieve preferential gains for signals received along this direction. Thus, a line-of-sight signal between the receiver and remote source will gain preferentially over a reflected signal that is received in a different direction. In a GNSS receiver this can lead to a remarkable increase in positioning accuracy because non-line-of-sight signals (e.g. reflected signals) are sufficiently suppressed. The highest correlation may be achieved for a line-of-sight signal, even if the absolute power of this signal is less than that of a non-line-of-sight signal. If the system parameter is chosen to be a line-of-sight vector between the receiver and the remote source, then further accuracy can be obtained by testing different estimates of the true line-of-sight vector, as well as simultaneously calibrating this system parameter.

Amplitude and/or phase compensation based on a measured or assumed movement of the receiver in the first direction may be referred to as "motion compensation". Typically vectors indicative of the measured or assumed movement may be used to perform the motion compensation. Thus, motion compensation may be provided of at least one of the local signal, received signal and correlation signal based on each of the first and second estimates of at least one system parameter during the first time period.

An assumed movement of the receiver during the first time period may be provided when there is no sensor present or when the outputs from the at least one sensor are not available. An assumed movement may be calculated based on patterns of movement in previous epochs.

As has been outlined above, a typical comparison between the first and second phase-compensated and/or amplitude-compensated correlation signals comprises selecting the compensated correlation signal having the higher correlation or the more-likely evolution over time. The resolution in frequency space by which the present invention may discriminate between different phase compensations is inversely proportional to the coherent integration time of the correlation. Therefore, the selected correlation signal may be constrained to lie within a frequency window of width that is inversely proportional to the coherent integration time. The coherent integration time may be greater than or equal to one second, which is significantly greater than the coherent integration time used in current state-of-the-art GNSS receiver implementations (typically twenty milliseconds or less).

The enhanced frequency resolution of the present invention corresponds to an increased resolution of the system parameter values under test. In an embodiment, a lower bound on a difference between the first and second parameter estimates may be chosen to be inversely proportional to the coherent integration time. In this way, the system may test more finely separated parameter estimates than is possible using conventional receivers, and optimally choose the resolution of the parameter estimates to be tested, avoiding unnecessary computation.

Consider the following worked example: in determining a heading error one may conduct the following process. Construct a series of amplitude and/or phase compensated phasors corresponding to a measured or assumed motion of the receiver (for example detected by a sensor of a motion module) along the current heading estimate. Such phase and/or amplitude compensated phasors may be referred to as "motion compensated phasors". Construct a second set of motion compensated phasors tailored for a small change in the heading estimate, e.g. a rotation in heading of X degrees. The resolvable difference in estimates is dictated by the speed of the user and the length of the coherent integration time. The Doppler shift of the signal caused by the user motion causes a frequency shift according to the well-known Doppler equation. The resolution of the frequency measurements that can be made is determined by the inverse of the coherent integration time. For example, it is possible using a 1 second coherent integration to resolve a Doppler shift of 1 Hz caused by user motion. These two sets of motion compensated phasors are correlated with the incoming data and the correlation signals are compared. If the current heading estimate is closer to the true value than the "test" X degree estimate, then its correlation signal will be stronger (higher correlation). In this way the true heading estimate can be converged upon through multiple "hypothesis testing" and an optimisation routine.

Such a test using conventional GNSS processing would encounter problems: the correlation signals suffer multipath fading (an effect mitigated by the phase and/or amplitude compensation of the present invention), which would dominate the tests and make it impossible to clearly identify small errors in the parameters of interest. The results would in effect by very noisy. Similarly, conventional GNSS processing uses much shorter coherent integration times, reducing the frequency resolution available for a conventional GNSS processing method to resolve small changes in parameters. The long coherent integrations times enabled by the present invention increase the resolution of the frequency and phase measurements. In this way, and for both of these reasons, the present invention permits parameters to be learned and monitored more accurately and more confidently, and in more difficult signal environments, than can be achieved by a conventional receiver using standard Kalman-filter-based methods.

The method may further comprise storing in memory the estimate that is determined to be nearer the true value and/or true evolution over time of the system parameter. The estimate (which takes the form of a value and/or evolution over time) may be stored based on the determination during the first time period. At a second time or time period, the stored estimate may be re-used as appropriate. The second time or time period is typically subsequent to (after) the first time period. For example, the estimate may relate to a sensor bias that may be used in order to provide positioning, navigation, frequency or timing data at the second time or time period. The calibration of the system parameters may be carried out at set time intervals, between which the stored estimate may be used. In the case where the method comprises providing a measured or assumed movement of the receiver during the first time period, the estimate may be re-used when the measured or assumed motion of the receiver at the second time or time period is substantially similar to that during the first time period.

Such re-use of a stored estimate, where appropriate, advantageously reduces the computational load, decreasing power consumption and thereby improving battery life when implementing the method on a user device.

In a preferred arrangement the receiver is a GNSS receiver and the remote source is a GNSS satellite. Positioning and navigation using GNSS positioning and navigation devices produces a number of difficulties indoors, where signals are weak, and in so-called "urban canyons", where there can be multi path signals. By allowing for estimates of system parameters to be tested by comparing associated compensated correlation signals, the correlation can be optimised whilst at the same time calibrating one or more system parameters.

The method of the first aspect is typically a computer-implemented method. The method is preferably performed in a positioning, navigation, tracking, frequency-measuring, or timing system In accordance with a second aspect of the invention there is provided a computer readable medium comprising instructions that when executed by a computer cause the computer to perform the method of the first aspect. The computer readable medium may be provided at a download server. Thus, the executable instructions may be acquired by the computer by way of a software upgrade.

In accordance with a third aspect of the invention there is provided positioning, navigation, tracking, frequency-measuring, or timing system, comprising: a local signal generator, configured to provide a local signal; a receiver configured to receive a signal from a remote source; a correlation unit configured to provide a correlation signal by correlating the local signal with the received signal, and; a processor configured to perform the steps of: providing amplitude and/or phase compensation of at least one of the local signal, the received signal and the correlation signal based on first and second estimates of at least one system parameter during a first time period so as to provide first and second amplitude-compensated and/or phase-compensated correlation signals corresponding to the first and second estimates of the at least one system parameter during the first time period, wherein the at least one system parameter has a true value and/or true evolution over time during the first time period and; determining which of the first and second estimates is nearer the true value and/or true evolution over time of the at least one system parameter during the first time period, based on a comparison between the first and second amplitude-compensated and/or phase-compensated correlation signals.

The navigation, tracking, frequency-measuring, timing or positioning system may be operable to perform at least one of navigation, tracking, frequency-measuring, timing or positioning operations.

Preferred embodiments of the third aspect of the present invention are set out in the appended claims and provide corresponding advantages as have been outlined above.

The system may further comprise a motion module configured to provide a measured or assumed movement of the receiver during the first time period, and wherein the amplitude and/or phase compensation is based on the measured or assumed movement of the receiver. The motion module preferably comprises at least one sensor configured to make measurements from which position and/or orientation and/or movement may be determined, and is typically an inertial sensor such as an accelerometer, gyroscope, barometer or magnetometer. Other sensors as would be understood by those skilled in the art may be used.

The positioning, tracking, navigation, frequency-measuring, or timing system may be provided on a single device. Various modules in the system could be provided separately so that the system is distributed. For example, certain calculations, such as the calculations performed by the correlation unit and motion unit may be undertaken by processors in a network. Thus, an electronic user device may offload calculations to other processors in a network where appropriate in the interests of efficiency.

In a preferred arrangement the system includes a GNSS positioning device, and the remote source is a GNSS satellite. Such a GNSS positioning device may be provided in an electronic user device such as a smartphone.

The system may comprise a memory configured to store the estimate that is determined to be nearer the true value and/or true evolution over time of the system parameter. The estimate (which may take the form of a value and/or evolution over time) may be stored based on the determination during the first time period. At a second time or time period, the stored estimate may be re-used as appropriate. For example, the estimate may relate to a sensor bias that may be used in order to provide positioning, tracking, frequency-measuring, navigation or timing data at the second time or time period. The calibration of the system parameters may be carried out at set time intervals, between which the stored estimate may be used. In the case where the system comprises a motion module, the estimate may be re-used when the measured or assumed motion of the receiver at the second time or time period is substantially similar to that during the first time period.

Such re-use of a stored estimate, where appropriate, advantageously reduces the computational load, decreasing power consumption and thereby improving battery life when the system is implemented on an electronic user device.

The estimate that is determined to be nearer the true value and/or true evolution over time may be stored, for example, in local storage located a user device where the system is provided on a single device. Alternatively or in addition the estimate may be stored remotely from a user device, for example through use of a client-server system.

BRIEF DESCRIPTION OF THE DRAWINGS

The invention will now be described with reference to the attached drawings, in which.

DETAILED DESCRIPTION

Figure 15:
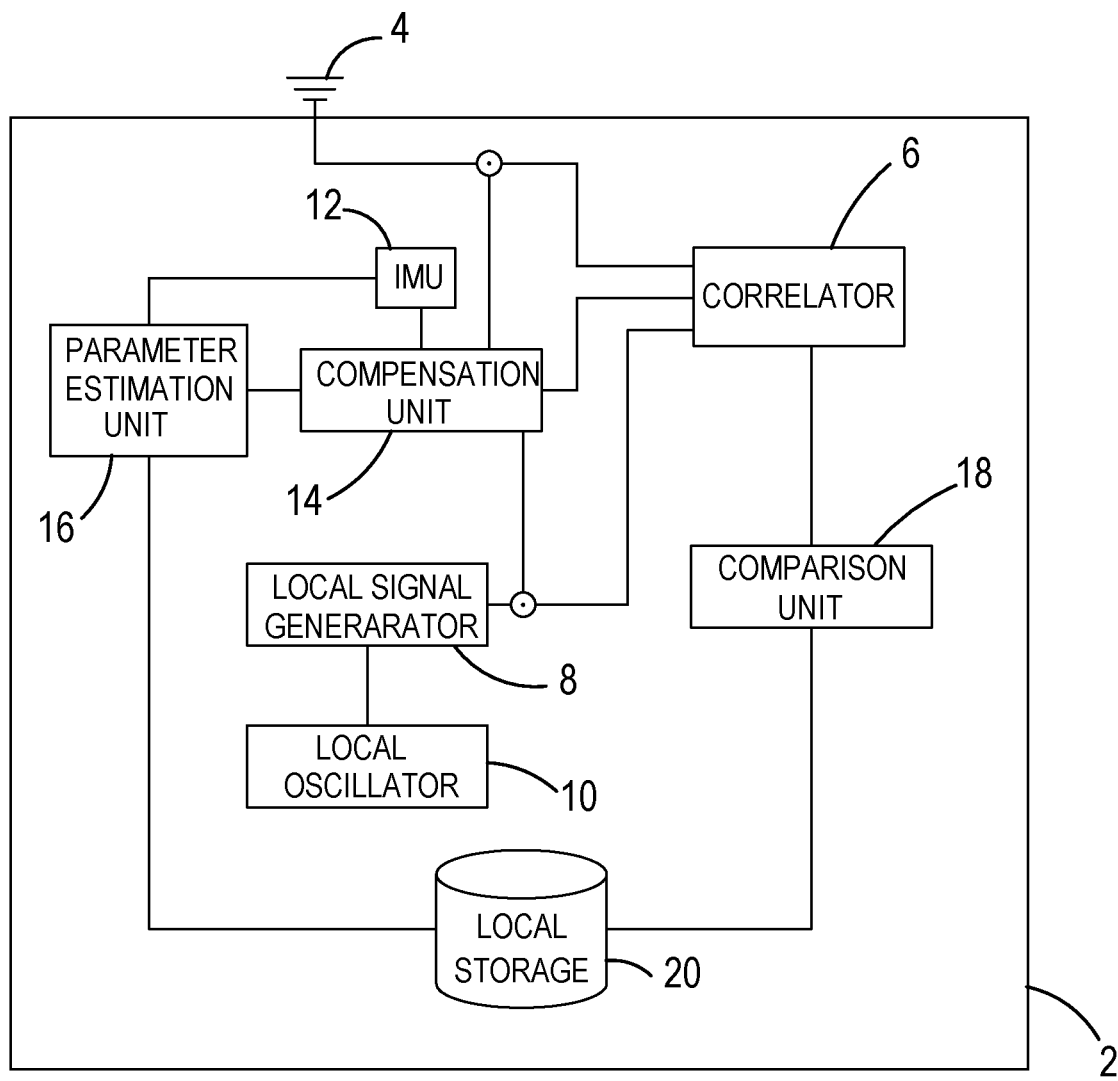
FIG. 15 is a schematic diagram showing a positioning system that may be used according to an embodiment of the invention.

FIG. 15 is a schematic diagram showing a positioning system that may be used according to an embodiment of the invention. A receiver 2 includes an antenna 4 for receiving radio signals, including GNSS signals. Received signals are correlated in a correlator 6 against a local signal generated by a local signal generator 8. The local signal generator 8 is configured to generate local copies of known correlation sequences (such as pseudorandom number (PRN) codes for GNSS satellites), using a frequency reference of a local oscillator (LO) 10.

An inertial measurement unit (IMU) 12 includes sensors that can determine the motion, position and/or orientation of the receiver 2 during a first time period, in particular the motion, position and/or orientation of the antenna 4. The IMU 12 can include accelerometers, gyroscopic sensors and other inertial sensors. A parameter estimation unit 16 receives data from the IMU obtained during the first time period. In this example, the data from the IMU are used to provide first and second estimates of at least one system parameter during the first time period. The at least one system parameter has a true value and/or true evolution over time during the first time period. The parameter may be, for example, a direction-of-motion of the receiver 2 during the first time period. In other examples, the parameter may be a frequency error of the LO.

Compensation unit 14 receives data from the IMU which are used to provide a prediction of the phase and/or amplitude evolution of the received signal during the first time period based on a measured or assumed motion of the receiver 2 during the first time period. Compensation unit 14 also receives the first and second estimates from the parameter estimation unit 16. The compensation unit 14 calculates a set of phasors representing the predicted evolution of the phase and/or amplitude of the received signal during the first time period dependent upon each of the first and second estimates. The phasors are then used to perform amplitude and/or phase compensation over the first time period for both the first and second parameter estimates. The amplitude and/or phase compensation may be performed on the local signal, the received signal or the correlation signal provided by correlator 6, or a combination thereof.

First and second amplitude and/or phase-compensated correlation signals, corresponding to the first and second parameter estimates respectively, are provided by the correlator 6 to the comparison unit 18. Here, the comparison unit 18 determines which of the first and second estimates is nearer the true value and/or true evolution over time of the at least one system parameter during the first time period by comparing the first and second correlation signals. This is typically performed by selecting the correlation signal having the higher correlation or the more-likely evolution over time.

The determined estimate of the system parameter may then be stored in local storage 20. In embodiments, an iterative process may be performed by using the determined estimate to provide a further estimate of the parameter value and/or evolution with time during the first time period, in order to provide an optimal estimate of the system parameter during the first time period.

Figure 16:
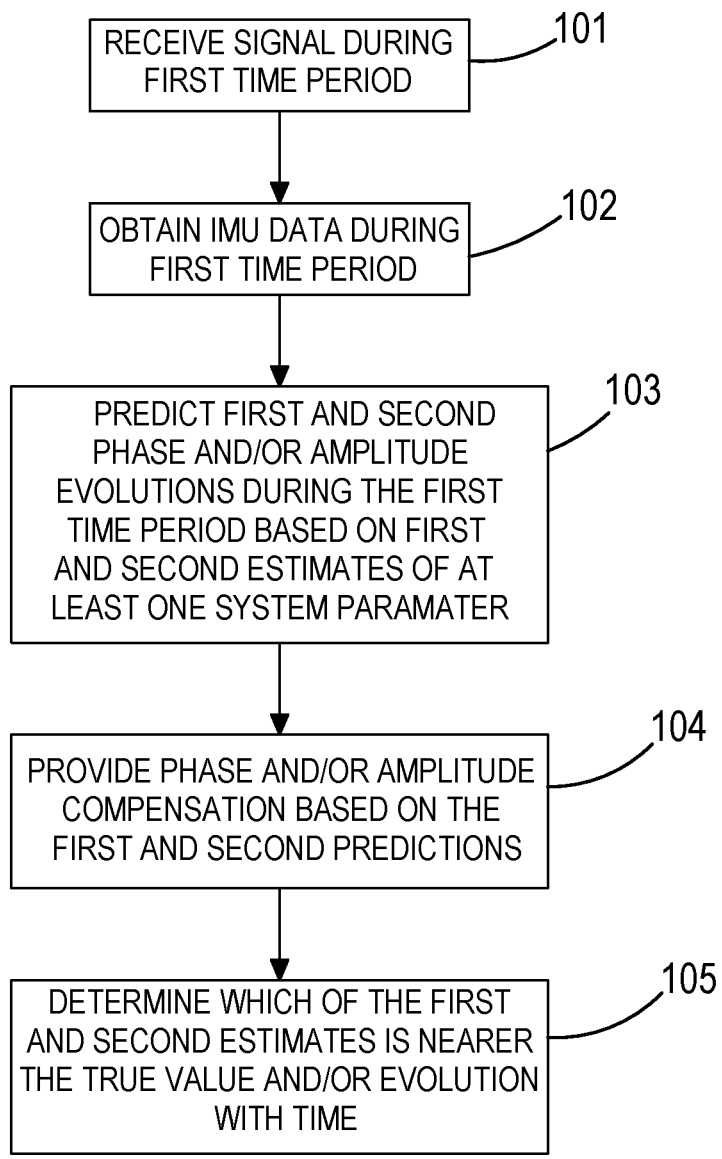
FIG. 16 is a flow diagram showing steps that can be undertaken in an embodiment of the invention.

FIG. 16 is a flow diagram showing steps that can be undertaken in an embodiment of the invention, with reference to the receiver 2 for example.

At step 101, the antenna 4 receives a radio signal, including GNSS signals, during a first time period. At step 102, IMU data is obtained, by the inertial measurement unit 12, during the first time period.

At step 103, the parameter estimation unit 16 provides first and second estimates of at least one system parameter having a true value and/or evolution with time during the first time period. The first and second estimates may be based on the IMU data. Based on the first and second estimates, together with the data from the IMU, the compensation unit 14 provides respective first and second predictions of the phase and/or amplitude evolution of the received signal during the first time period.

At step 104, the signal received during the first time period is processed in order to provide phase and/or amplitude compensation. This is performed on at least one of the local signal produced by local signal generator 8, the received signal, and the correlation signal generated by correlator 6. The amplitude and/or phase compensation is performed based on the first and second predictions of the phase and/or amplitude evolution of the received signal during the first time period, and is typically based on a set of phasors representing the predicted amplitude and/or phase evolution. The resulting correlation signals may be referred to as compensated correlation signals.

At step 105, the comparison unit 18 determines which of the first and second parameter estimates is nearer the true value and/or true evolution over time during the first time period based on a comparison between the first and second compensated correlation signals. Typically, the compensated correlation signal having the highest correlation and/or most likely evolution over time is selected, and the parameter estimate corresponding to the selected compensated correlation signal is determined to be nearer the true value and/or true evolution with time during the first time period.

The estimate that is determined to be nearer the true value and/or evolution over time may then be used to iteratively provide further estimates until an optimum value and/or evolution with time is determined.

One form of noise that can arise in a communications channel arises from multi-path effects. A signal received at a receiver may have arrived at the receiver via multiple different paths each of which has different characteristics such as path length. The multi-path signals received are therefore generally received at different times and possibly with different attenuation characteristics and phase. Each multi-path signal may therefore act as noise in relation to each of the other multi-path signals. This can be a significant problem in circumstances where multi-path conditions are prevalent.

Even where multi-path conditions are not prevalent, noise can arise from other sources such as for example frequency reference drift due to frequency reference instability at a receiver, movement of the receiver causing Doppler shifts in frequency, and timing misalignment between a transmitter and the receiver, electromagnetic interference, and intentional jamming.

The signal may also be attenuated by the environment, for example obstructions in the propagation channel, degrading the signal to noise ratio of the received signal.

The inventors have realized that by performing a phase-compensated correlation it is possible to significantly improve the correlation of the received digital signal and a correlation code. By compensating for phase variations (arising from movement of the receiver and otherwise) the gain of signals received is enhanced and the signal to noise ratio of the received signals is increased.

By, for example, performing phase-compensated correlation along a particular direction the correlation between received digital signals and the correlation code is significantly biased towards the correlation of a digital signal received along that particular direction and the correlation code. By compensating for phase variations (arising from movement of the receiver and otherwise) in a particular direction the gain of signals received from that particular direction is enhanced while the gain of signals received not from that direction (i.e. reflected signals arriving at the receiver from other directions) is decreased.

Motion-compensated correlation is a type of phase-compensated correlation that reduces or removes the effects of Doppler frequency shift arising from movement of a receiver.

The inventors have created new types of phase-compensated correlation sequences.

These phase-compensated correlation sequences may be stored and may be re-used.

One type (a supercorrelator) is a motion-compensated correlation sequence that can be used to perform motion-compensated correlation, for example, in situations where other error sources such as local oscillator drift are negligible or removed through modelling/estimation. Another type (an ultracorrelator) is a motion-compensated correlation sequence where the local oscillator frequency error is being directly compensated, without relying on modelling, and can be used to perform motion-compensated correlation.

A further advantage of using phase-compensated correlation is that longer correlation periods can be used to improve correlation gain. The use of longer correlation periods significantly improves the correlation gain and so makes the receiver significantly more sensitive.

A further advantage of phase-compensated correlation is the ability to perform long coherent integrations.

The following definitions will be used in this detailed description:

A digital signal is a sequence of discrete symbols. A digital signal may, for example, be a modulated analog carrier wave, a sampled version of a modulated analog carrier wave or a sampled and quantised version of a modulated analog carrier wave.

A symbol represents an integer number of one or more bits. A symbol may, for example, be represented by a particular waveform, a sample or samples of a particular waveform or a quantised sample or samples of a particular waveform. A sample may, for example, be a complex value or a real value.

A correlation code is a certain sequence of symbols that is known to have specific autocorrelation properties.

A correlation sequence is a sequence of symbols that is correlated with a digital signal during correlation. The correlation sequence may be represented in the form of a sequence of real numbers, or a sequence of complex numbers.

Phase-compensated correlation is correlation that uses a phase-compensated correlation sequence.

A phase-compensated correlation sequence is a correlation sequence that has been phase-compensated, in some examples differently along its length, in dependence upon a time varying or time invariant phase.

Motion-compensated correlation is correlation that uses a motion-compensated correlation sequence.

A motion-compensated correlation sequence is a correlation sequence that has been phase-compensated in dependence upon movement (assumed or measured) of a receiver. A motion-compensated correlation sequence is used in this document to refer to either a motion-compensated phasor sequence or a motion-compensated correlation code. In practice, the motion compensated correlation sequence is constructed using a motion-compensated phasor sequence.

A motion-compensated phasor sequence is a sequence of phasors that have been phase-compensated in dependence upon movement (assumed or measured) of a receiver.

A motion-compensated correlation code is a correlation code that has been compensated by a sequence of phasors that have been phase-compensated in dependence upon movement (assumed or measured) of a receiver. A motion-compensated correlation code may, for example, be formed by the combination of a correlation code and a motion-compensated phasor sequence.

Phase compensation can be provided by direct measurements, modelling/predicting/estimating behaviour, or through indirect methods such as an optimisation process over a range of possibilities.

A phase-compensated correlation code is a correlation code that has been compensated by a sequence of phasors that have been phase-compensated in dependence upon movement (assumed or measured) of a receiver and/or other sources of frequency variation, such as the time-dependent frequency error on a local frequency reference in a radio receiver. A phase-compensated correlation code may, for example, be formed by the combination of a correlation code and a phase-compensated phasor sequence.

Coherent integration is the summation of sequences of symbols in such a manner as to preserve the phase relationship of the input sequence throughout, such that sections of the sequence can be added together constructively in both amplitude and phase.

Figure 1:
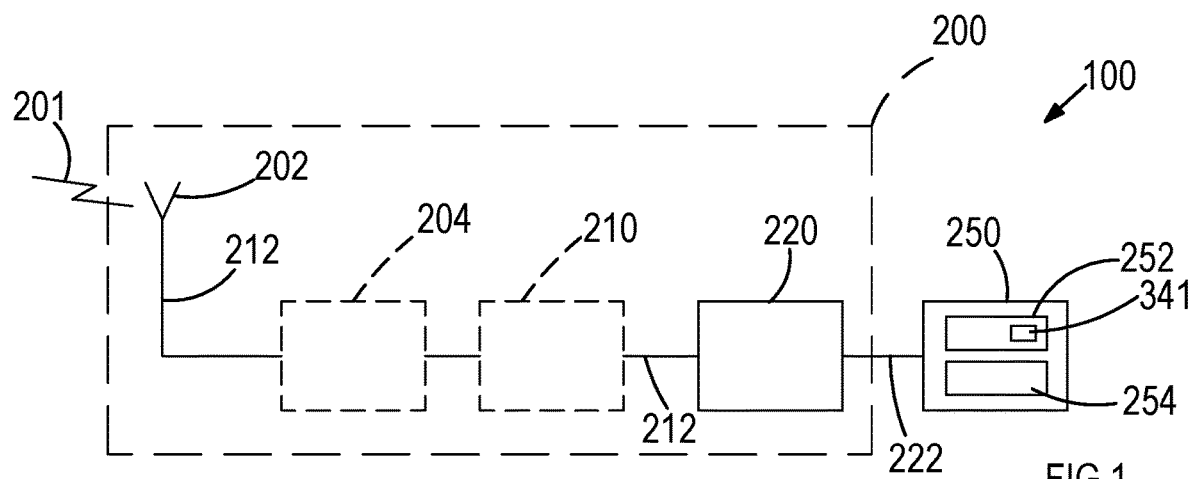
FIG. 1 illustrates an example of a system for correlating a digital signal and a correlation code.

FIG. 1 illustrates an example of a system 100 for correlating a digital signal 222 and a correlation code 341. The system 100 comprises a receiver system (receiver) 200 and processing system 250.

The receiver 200 comprises an antenna or antennas 202 for receiving signals 201 to produce an analogue signal 212 comprising a digital signal 222. In this example, but not necessarily all examples, the analogue signal 212 is amplified by a pre-amplifier 204, however this stage is optional. Next the analogue signal 212, in this example but not necessarily all examples, is down-converted by down-converter 210 to a lower frequency analogue signal comprising a digital signal 222 However, this stage is also optional. The analogue signal 212 is then converted from analogue form to digital form by analogue to digital converter 220 to produce a digital signal 222 in digital form. The received digital signal 222 is provided, whether in analog form or digital form, to processing system 250.

The processing system 250 comprises a correlation system 252 and also, in this example but not necessarily all examples, comprises a control system 254. The correlation system 252 correlates the received digital signal 222 with a correlation code 341. The control system 254, if present, may be used to control the correlation system 252.

Figure 2:
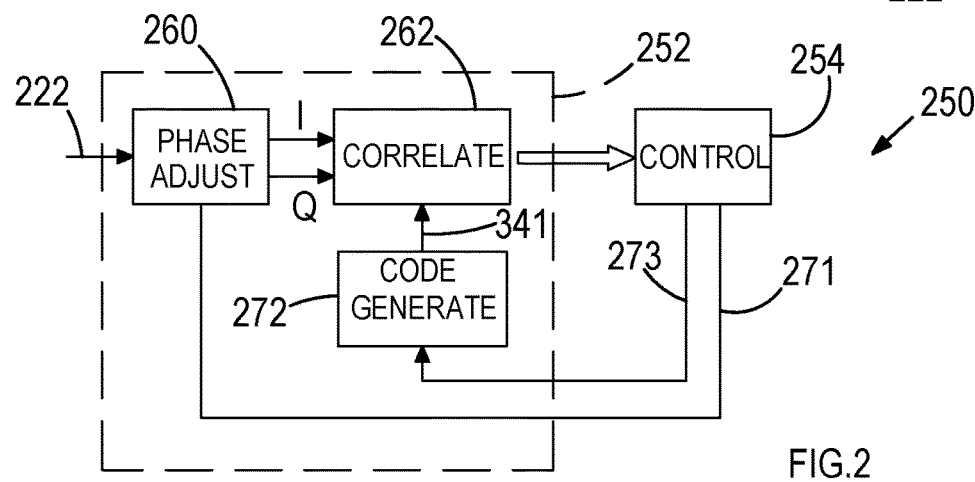
FIG. 2 illustrates an example of the system for correlating a digital signal and a correlation code that does not use phase-compensated correlation based on a phase-compensated correlation sequence.

FIG. 2 illustrates an example of the processing system 250 for correlating a digital signal 222 and a correlation code 341. In this particular example, but not necessarily all examples, the digital signal 22 has been output from an analogue to digital converter 220 and is in digital form. This example does not use phase-compensated correlation based on a phase-compensated correlation sequence and is intended to demonstrate the difference between phase-compensated correlation using a phase-compensated correlation sequence and correlation that is not phase-compensated because it does not use a phase-compensated correlation sequence.

Initially a phase-adjustment module 260 adjusts the phase of the received digital signal 222. This phase adjustment produces an in-phase digital signal (I) and a quadrature phase digital signal (Q). These complex digital signals are provided to a correlation module 262 which correlates the phase-adjusted digital signals with a correlation code 341. The results of the correlation module 262 are output from the correlation system 252 to the control system 254. The control system 254 uses the results of the correlation to provide a closed loop phase adjustment signal 271 to the phase adjustment module 260 and to provide a closed loop code adjustment signal 273 to a code generation module 272 used to produce the correlation code 341.

Code-phase alignment may be achieved by adjusting the correlation code 341 using the closed loop code adjustment signal 273 which may, for example, form part of a delay locked loop. Carrier-phase alignment may be achieved by adjusting the phase of the received digital signal via the closed loop phase adjustment signal 271 which may be part of a phase locked loop.

While signal to noise levels are sufficiently high and a lock of the closed control loops is maintained, the closed control loops automatically compensate for Doppler shift arising from relative movement between the antenna 202 and a source of the received digital signals 222. However, "lock" may be absent during an acquisition phase, or lost due to temporary signal loss or due to low signal to noise levels, for example.

Figure 3:
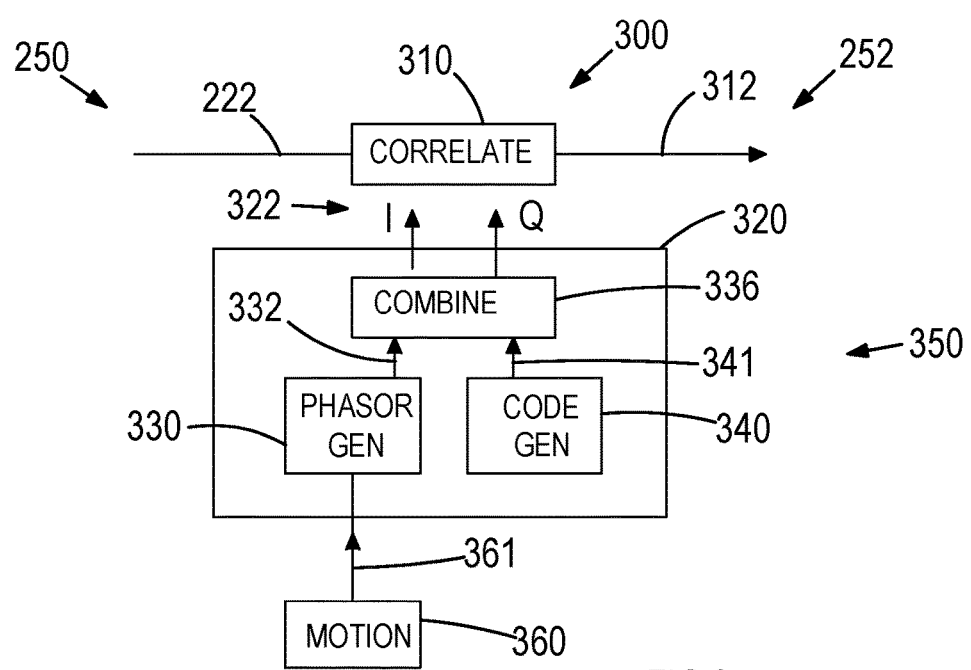
FIG. 3 illustrates an example of a correlation system suitable for use in a processing system of a system for phase-compensated correlation of a digital signal and a correlation code.

The inventors have developed a new processing system 250, illustrated in FIG. 3 that is suitable for use in a system as illustrated in FIG. 1.

The new processing system provides improved correlation of the received digital signal 222 and a correlation code 341 by using phase-compensated correlation based upon a phase-compensated correlation sequence.

It should be appreciated that the processing system 250 of FIG. 3, in contrast to the processing system 250 of FIG. 2, uses open loop control 350 to produce a phase-compensated correlation code 322 used in a correlator 310 to correlate with the received digital signal 222.

The processing system 250 illustrated in FIG. 3 may, for example, be a permanent replacement to the processing system 250 illustrated in FIG. 2 or may be used on a temporary basis as an alternative to the processing system 250 illustrated in FIG. 2.

The open loop control 350 of the processing system 250 in FIG. 3 may be based upon phase parameter information 361. The phase parameter information may be provided, for example, from a model (assumed) or from a sensor (measured). In some but not necessarily all examples, the phase parameter information is sensor information, for example, an assumed or measured movement 361 of the receiver 200 and is not based upon feedback (closing the loop) from the results of any correlation.

The processing system 250 for phase-compensated correlation of a received digital signal 222 and a correlation code 341 may be used fora number of different applications. It may, for example, be used for time and/or frequency synchronization and/or channel estimation and/or channel separation.

The correlation code 341 used may be application-specific. For example, where the processing system 250 is part of a direct sequence spread spectrum communication system such as a CDMA mobile telecommunications receiver, the correlation code (chipping code) is a pseudo-random noise code. For example, if the receiver 200 is a receiver for a global navigation satellite system (GNSS) the correlation code is a pseudo-random noise code, for example, a Gold code. For example, if the receiver 200 is a receiver for a communication system, the correlation code may be a training or pilot symbol sequence such as those used in orthogonal frequency division multiplexing (OFDM), long term evolution (LTE) and digital video broadcasting (DVB) standards.

In some examples, the correlation code 341 may be dependent upon an identity of a transmitter of the digital signal 222 separating the communication channel into different code divided channels via code division multiple access.

In some circumstances the digital signal 222 is modulated with data, for example navigation bits in a GNSS system. However, in other examples the digital signal 222 is not modulated with data such as, for example, when it is a training or pilot sequence.

FIG. 3 illustrates an example of a correlation system 252 suitable for use in a processing system 250 of a system 100 for phase-compensated correlation of a digital signal 222 and a correlation code 341. The phase-compensated correlation system 252 provides a phase-compensated correlator 300 comprising a correlator 310 and a phase-compensated correlation sequence generator 320.

It should be appreciated that FIG. 3 illustrates an example of a phase-compensated correlation system 252 that performs correlation in the digital domain post-sampling. This phase-compensated correlation system 252 is suitable for use in the processing system 250 illustrated in FIG. 2. However, different processing systems 250 are possible and different phase-compensated correlation systems 252 are possible. A phase-compensated correlation system 252 does not necessarily have to be suitable for use in the processing system 250 illustrated in FIG. 2. Some phase-compensated correlation systems 252 may perform correlation in the analog domain before or after down-conversion. Other phase-compensated correlation systems 252 may perform correlation in the digital domain but without analog down-conversion or without full analog down-conversion and they may, in some examples, use digital down-conversion.

A phase parameter module 360 which may or may not form part of the phase-compensated correlator 300 provides phase parameter information 361, indicative of time-variable phase parameters, to the phase-compensated correlation sequence generator 320.

For example, in some but not necessarily all examples, a receiver-motion module 360 which may or may not form part of the phase-compensated correlator 300 provides a movement signal 361, indicative of movement of the receiver 200, to the phase-compensated correlation sequence generator 320.

The phase-compensated correlation sequence generator 320 comprises a phase-compensated phasor generator 330 which receives the phase parameter information 361 and produces a phase-compensated phasor sequence 332.

The phase-compensated correlation sequence generator 320 additionally comprises a correlation code generator 340 which produces a correlation code 341.

The phase-compensated correlation sequence generator 320 additionally comprises a combiner (mixer) 336 which combines the phase-compensated phasor sequence 332 and the correlation code 341 to produce a phase-compensated correlation code 322.

The phase-compensated correlation code 322 is provided by the phase-compensated correlation sequence generator 320 to the correlator 310 which correlates the phase-compensated correlation code 322 with the received digital signal 222 to produce the correlation output 312.

The phase-compensated correlator 300 when performing motion-compensation comprises an open loop 350 from the receiver-motion module 360 through the phase-compensated correlation sequence generator 320 to the correlator 310. There may be feedback resulting from the correlation output 312 to the phase-compensated correlation sequence generator 320. Closed loop feedback can occur between the output of the phase-compensated correlator 300 and the phase-compensated correlation sequence generator 320 or the phase parameter module 360 or the phase adjust module 260 or the down-convertor 210

It will therefore be appreciated that the correlator 310 performs the following method: correlating a digital signal 222 provided by a receiver 200 with a phase-compensated correlation code 322, wherein the phase-compensated correlation code 322 is a correlation code 341 that has been compensated at or before correlation using one or more phasors. The correlation code 341 is compensated for phase variation at or before correlation by combining the correlation code 341 with the phase-compensated phasor sequence 332. The phase-compensated phasor sequence 332 is dependent upon phase variation during the time that the receiver 200 was receiving the digital signal 222.

The use of an open loop 350 for controlling the phase-compensated correlation has advantages, for example, it is fast because the control is not based upon the result of a preceding correlation. The use of the open loop control to perform phase-compensated correlation enables the correlator 310 to operate in situations where there is a low signal to noise ratio.

Although in FIG. 3 phase parameter module 360, the phase-compensated correlation sequence generator 320 and the correlator 310 are illustrated as part of the phase-compensated correlator 300, in other examples only the correlator 310 may be part of the correlation system with the phase-compensated correlation code 322 being provided to the phase-compensated correlator 300 by a phase-compensated correlation system generator 320 that is not part of phase-compensated correlator 300. In other examples, only the correlator 310 and the phase-compensated correlation sequence generator 320 may be part of the phase-compensated correlator 300 with the phase parameter module 360 providing the phase parameter information 361 to the phase-compensated correlator 300.

Although in this example, the phase-compensated correlation sequence generator 320 is illustrated as a single entity comprising the phase-compensated phasor generator 330, the correlation code generator 340 and the combiner (mixer) 336, it should be understood that these may be components distinct from the phase-compensated correlation sequence generator 320 or combined as components other than those illustrated within the phase-compensated correlation sequence generator 320.

It will be appreciated by those skilled in the art that the phase-compensated correlator 300 illustrated in FIG. 3 is a significant and remarkable departure from what has been done before in that it adopts a counter-intuitive approach by modifying the correlation code 341 at or before correlation even though those correlation codes 341 may have been carefully designed for excellent cross-correlation results.

The phase-compensated correlator 300 illustrated in FIG. 3 may be permanently functional or may be temporarily functional. For example it may be functional during a satellite acquisition phase in a GNSS receiver, and/or when there is signal loss and/or when there are low signal to noise levels for example. The phase-compensated correlator 300 may preserve the phase coherence of the digital signal 222, thus allowing longer coherent integration times.

Figure 4:
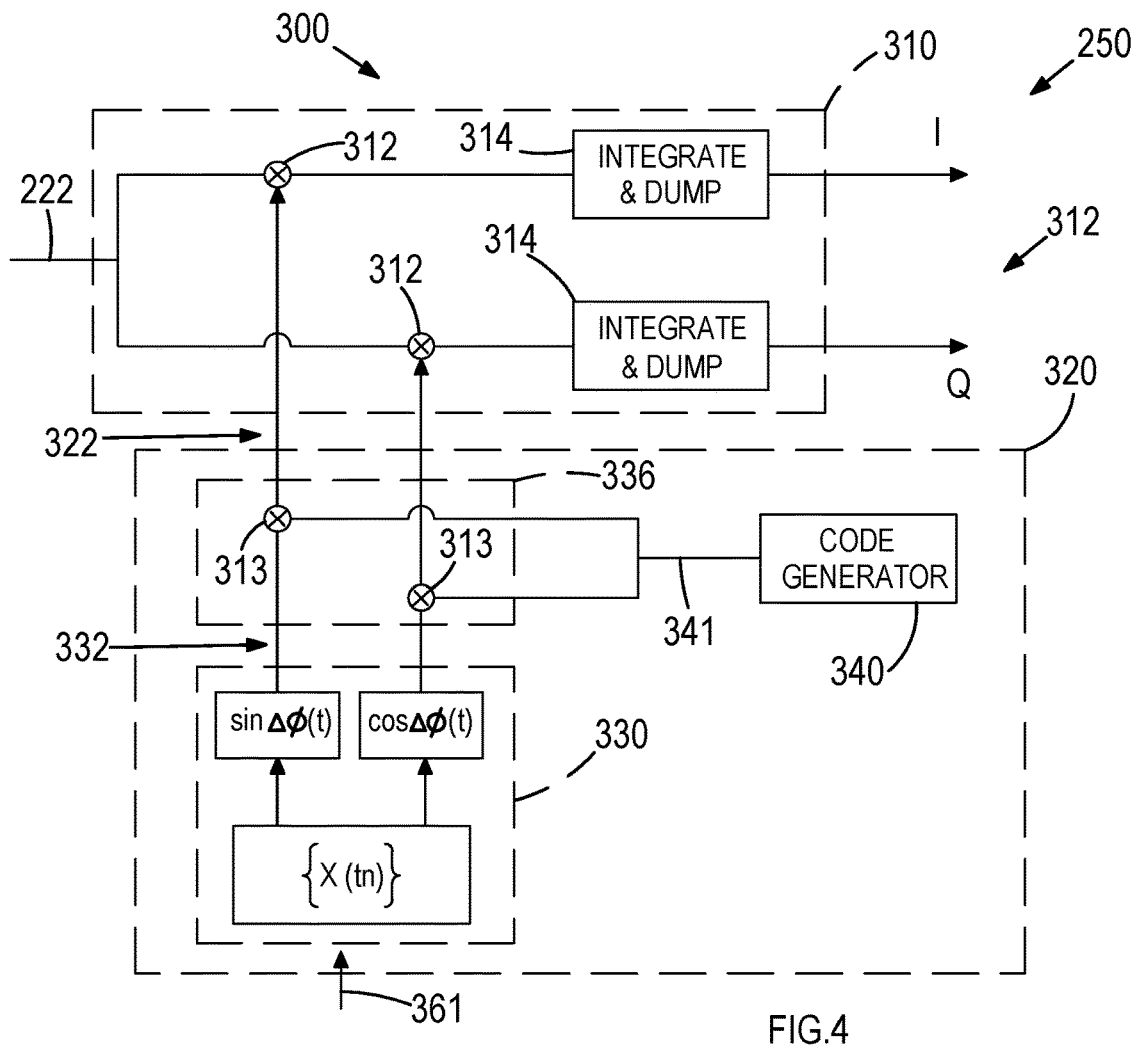
FIG. 4 illustrates an example of a phase-compensated correlator.

FIG. 4 illustrates an example of the phase-compensated correlator 300 illustrated in FIG. 3. This figure illustrates potential sub-components of the correlator 310, and the phase-compensated correlation sequence generator 320.

In this example the phase-compensated phasor generator 330 produces a phase-compensated phasor sequence 332 that comprises an in-phase component I and a quadrature phase component Q. Both of the in-phase component I and the quadrature phase component Q are mixed 313 with the same correlation code 341 produced by the code generator 340 to produce as the phase-compensated correlation code 322 an in-phase component I and a quadrature phase component Q. The correlator 320 mixes 312 the in-phase component of the phase-compensated correlation code 322 with the received digital signal 222 and performs an integration and dump 314 on the result to produce an in-phase correlation result 312. The correlator 310 mixes 312 the quadrature phase phase-compensated correlation code 322 with the same received digital signal 222 and performs an integration and dump 314 on the result to produce the quadrature phase correlation result 312.

It is important to note that the production of in-phase and quadrature phase signals occurs within the phase-compensated correlation code generator 320 when the phase-compensated phasor sequence 332 is produced. The combination (mixing) of the phase-compensated phasor sequence 332 with the correlation code 341 produces the phase-compensated correlation code 322 which is correlated with the received digital signal 222 to produce the correlation output 312.

The integration performed within the correlator 310 produces a positive gain for those received digital signals 222 correlated with the phase-compensated phasor sequence 332. Those received digital signals 222 that are not correlated with the phase-compensated phasor sequence 332 have a poor correlation with the phase-compensated correlation code 322. There is therefore a differential gain applied by the phase-compensated correlator 300 to received digital signals 222 compared to noise. It will therefore be appreciated that the phase-compensated correlator 300 significantly improves correlation performance.

Parametric Model for Phase Variation

A phase sequence $\{\Phi(t_n)\}$ is defined by a sequence of N (N>1) phase values $\Phi(t_n)$ in radians at N defined times $t_n$ during a time t=0 to t=T. The time interval $t_{n-1}$ to $t_n$ corresponds to the radio sampling interval.

$$\Phi(t_n) = \int_0^{t_n} 2\pi.F(t).dt + \Phi_0 \quad \text{or} \qquad \text{—Equation 1}$$

$$\Phi(t_n) = \Phi(t_{n-1}) + \int_{t_{n-1}}^{t_n} 2\pi.F(t).dt \quad \text{where} \qquad \text{—Equation 2}$$

$F(t) = f_D(t) + f_{Rerr}(t)$ and $\Phi_0$ is the initial value of phase at time $t = 0$.

F(t) in the integral is time varying on a timescale down to the radio sampling period—that is the time between successive radio samples. It is not fixed over the correlation code word length but varies along the correlation code word length.

$f_D(t)$ is the (time dependent) Doppler frequency at the receiver due to user and source (e.g. a satellite) motion $f_{Rerr}(t)$=is the (time dependent) receiver frequency reference frequency error Where, from the first order Doppler equation $f_D=(1+(v_u/c)) (f_0+f_{Serr}(t))$
where
c is the speed of light
$v_u$ is the (time dependent) relative speed of the receiver towards the actual or assumed signal source in the direction of u ($v_u=(v_s-v_r)\cdot u$).
$v_r$ is the (time dependent) velocity of the receiver,
$v_s$ is the (time dependent) velocity of the source of the digital signal,
u is the (time dependent) unit vector defining a direction of arrival of a signal, for a directly received signal this defines the line of sight (LOS) unit vector $u_{LOS}$ between receiver and signal source, but it may alternatively be an expected direction of arrival.
$f_0$ is the nominal transmitted frequency. All signal sources may have a common $f_0$.
$f_{Serr}(t)$ is the (time dependent) source frequency reference frequency error.

It is not normally necessary to use a higher order Doppler equation such as a relativistic Doppler equation. Although it may be used in some circumstances e.g. for very long integration times (many seconds).

The phase $\Phi(t_n)$ is the total change in phase produced as a consequence of the nominal transmitted frequency, any Doppler frequency shift resulting from motion of the receiver relative to the source, and any frequency errors associated with the source and receiver frequency references. It may be referred to as the 'total' phase, or as the compensation phase as it is used to compensate correlation or as a model phase as it is based on a parametric model where the potentially variable parameters may be for example $f_{Rerr}(t)$, $v_r$ $v_s$ u, $f_{Serr}(t)$.

Expanding Equation 1

$$\Phi(t_n) = \int_0^{t_n} 2\pi.\left[\left\{1 + \left(\frac{[(v_s(t) - v_r(t)).u(t)]}{c}\right)\right\}(f_o + f_{Serr}(t)) + f_{Rerr}(t)\right].dt + \Phi_0 \qquad \text{Equation 3}$$

The phase sequence $\{\Phi(t_n)\}$ is therefore modelled as dependent upon $f_0$, $f_{Rerr}$, $f_{Serr}$, $v_s$, $v_r$ and u. The phase sequence $\{\Phi(t_n)\}$ according to this model can therefore be used to improve phase coincidence/alignment between a correlation sequence and a received signal during correlation, significantly improving correlation gain. The model is used to produce a phase-compensated correlation code that represents the digital signal as received according to the model.

It should be noted that the integral in Equation 2 for determining a single phase value $\Phi(t_n)$ is over a time period less than a correlation code word length. It is therefore possible to account for changes, for example, in receiver motion on timescales shorter than a single correlation code word length. It should also be noted that the value of F(t) in Equations 1 and 2 may vary on a timescale shorter than a correlation code word length. The time duration T of the phase sequence $\{\Phi(t_n)\}$ is in some examples equal to one or more correlation code word durations. In some examples it may be thousands of correlation code word lengths.

The phase values within the phase sequence $\{\Phi(t_n)\}$ vary at the radio sampling rate. The frequencies $f_{Rerr}(t)$ $f_{Serr}(t)$ might be constant over more than one radio sample or the receiver may be stationary over more than one radio sample, but the phase is always changing, according to Equations 1-3, it is not constant over the coherent integration time T.

Equation 3 expressing the total phase variation $\Phi(t_n)$ may be re-written as:

$\Phi(t_n)=\Phi_{fo}(t_n)+\Phi_{f\_Serr}(t_n)+\Phi_{f\_Rerr}(t_n)+\Phi_{Doppler}(t_n)+\Phi_0$ —Equation 4

$\Phi_{fo}(t_n)$ is the phase variation due to nominal transmission frequency.

$\Phi_{fo}(t_n)=\int_0^{t_n}2\pi.f_o\cdot dt$ $\Phi_{f\_Serr}(t_n)$ is the phase variation due to satellite frequency reference frequency error.

$\Phi_{f\_Serr}(t_n)=\int_0^{t_n}2\pi.f_{Serr}(t)\cdot dt$ $\Phi_{f\_Rerr}(t_n)$ is the phase variation due to receiver frequency reference frequency error.

$\Phi_{f\_Rerr}(t_n)=\int_0^{t_n}2\pi.f_{Rerr}(t)\cdot dt$ —Equation 5

As the variation in this phase $\Phi_{f\_Rerr}(t_n)$ arises from the receiver frequency reference frequency error, it may be called the receiver frequency reference phase.

$\Phi_{Doppler}(t_n)$ is the phase variation due to Doppler frequency shift.

$$\Phi_{Doppler}(t_n) = \int_0^{t_n} 2\pi.\left[\left(\frac{[(v_s(t) - v_r(t)).u(t)]}{c}\right)(f_o + f_{Serr}(t))\right].dt \qquad \text{—Equation 6}$$

As the variation in this phase $\Phi_{Doppler}(t_n)$ arises from the Doppler frequency shift, it may be referred to using the moniker 'Doppler phase'.

In some examples, it may be assumed that $\Phi_{fo}(t_n)$ is generated from a fixed frequency and $\Phi_{f\_Serr}(t_n)$ is known and/or well-behaved and their effects on the total phase variation $\Phi(t_n)$ and correlation can be compensated for over the coherent integration time by a constant frequency component.

Using the phase model defined by Equation 4 (or 3), partial knowledge of the total phase variation $\Phi(t_n)$ and the results of correlations with one or more received signals, it may be possible to determine the phase variation due to receiver frequency reference frequency error $\Phi_{f\_Rerr}(t_n)$ (if any), and/or the phase variation due to Doppler frequency shift $\Phi_{Doppler}(t_n)$ (if any) and/or the total phase variation $\Phi(t_n)$.

The phase variation due to receiver frequency reference frequency error $\Phi_{f\_Rerr}(t_n)$ depends on $f_{Rerr}(t)$ which may vary over the coherent integration time, particularly for longer coherent integration times and/or less stable frequency references.

The phase variation due to receiver frequency reference frequency error $\Phi_{f\_Rerr}(t_n)$ may be used to compensate a less accurate frequency reference, enabling the use of low cost frequency references at the receiver.

By measuring the phase variation due to receiver frequency reference frequency error $\Phi_{f\_Rerr}(t_n)$ at different times, it may be possible to model the phase variation due to receiver frequency reference frequency error $\Phi_{f\_Rerr}(t_n)$ at other times. For example, a polynomial fit or other model may be applied to the phase variations due to receiver frequency reference frequency error $\Phi_{f\_Rerr}(n)$ determined at different times. It may also be possible to use accelerometers, gyroscopes, or other motion measurement sensors to determine the forces on the receiver frequency reference that result in predictable frequency changes. In this way, frequency reference errors due to forces from motion can be directly compensated in the construction or modelling of this frequency reference error phasor term.

The phase variation due to Doppler frequency shift. $\Phi_{Doppler}(t_n)$ depends on $f_{Doppler}(t)$ which may vary over the coherent integration time, particularly for longer coherent integration times and/or a moving receiver.

The phase variation due to Doppler frequency shift $\Phi_{Doppler}(t_n)$ may be used to calibrate any assumptions or measurements concerning $v_r$, $v_s$, u.

A knowledge of the phase variation due to the Doppler frequency shift $\Phi_{Doppler}(t_n)$ allows that variation to be compensated for during correlation. This compensation is particular to $v_r$, $v_s$ u defining the phase variation due to the Doppler frequency shift—it is therefore a selective filter dependent on $v_r$ that significantly attenuates signals from incorrect sources ($v_s$) and from incorrect directions of arrival (u). A moving receiver may therefore have significantly increased gain for 'correct' signals and reduced gain for 'incorrect' signals arising from the motion-compensated correlation provided by the phase variation due to the Doppler frequency shift $\Phi_{Doppler}(t_n)$.

A knowledge of the time variation of the total phase variation $\Phi(t_n)$ allows that variation to be compensated for during correlation enabling extremely long coherent integration times and very significantly increased gain.

In some but not necessarily all examples, it may be assumed that the phase variation due to the receiver frequency reference frequency error $\Phi_{f\_Rerr}(t_n)$ (and also $\Phi_{f\_Serr}(t_n)$) is known and well behaved over the coherent integration time used for correlation. The remaining unknown component of the total phase variation $\Phi(t_n)$ is the phase variation due to Doppler frequency shift $\Phi_{Doppler}(t_n)$ and this may be calculated based on $v_r$, $v_s$, u. The value of $v_r$ may be assumed or measured. The coherent integration time may be many correlation code words in length, for example, a length of 1000 correlation code words of duration 1 ms is possible.

In some but not necessarily all examples, the phase variation due to the receiver frequency reference frequency error $\Phi_{f\_Rerr}(t_n)$ over the coherent integration time used for correlation is directly measured. If $\Phi_{f\_Serr}(t_n)$ is known, the remaining unknown component of the total phase variation $\Phi(t_n)$ is the phase variation due to Doppler frequency shift $\Phi_{Doppler}(t_n)$ and this may be calculated based on $v_r$, $v_s$, u. The value of $v_r$ may be assumed or measured. The coherent integration time may be many correlation code words in length, for example, a length of 10000 correlation code words of duration 1 ms is possible.

In some but not necessarily all examples, it may be assumed that $\Phi_{Doppler}(t_n)$ is known and well behaved over the coherent integration time used for correlation. This may, for example, be assumed when a satellite signal source is directly overhead or $v_r$, $v_s$, u are known. The remaining unknown component of the total phase variation $\Phi(t_n)$ is the phase variation due to the receiver frequency reference frequency error $\Phi_{f\_Rerr}(t_n)$ and the phase variation due to satellite frequency reference frequency error $\Phi_{f\_Serr}(t_n)$ (if any) and this component may be found by direct measurement using correlation of a high quality received signal or using hypothesis testing using one or more lower quality signals.

In some but not necessarily all examples, it may be assumed that the phase variation due to the receiver frequency reference frequency error $\Phi_{f\_Rerr}(t_n)$ is known to be within certain bounds, defined for example by an expected stability (e.g. Allan variance) of the receiver frequency reference, and/or the phase variation due to the Doppler frequency shift $\Phi_{Doppler}(t_n)$ is known to be within certain bounds, defined for example by an expected stability of inertial sensors used to measure $v_r$. and/or expected values of $v_r$ Multi-signal hypothesis testing may be used to determine the actual phase variation over the coherent integration time due to receiver frequency reference frequency error $\Phi_{f\_Rerr}(t_n)$ and/or the actual phase variation due to Doppler frequency shift $\Phi_{Doppler}(t_n)$. The hypothesises are constrained by the phase model (Equation 3, 4) and the expected bounds.

It may, for example, be assumed that the phase variation due to the receiver frequency reference frequency error $\Phi_{f\_Rerr}(t_n)$ is known to be within certain bounds, when a model
for estimating the phase variation due to the receiver frequency reference frequency error $\Phi_{f\_Rerr}(t_n)$ has expired and needs to be renewed.

It may, for example, be assumed that the phase variation due to the Doppler frequency shift $\Phi_{Doppler}(t_n)$ is known to be within certain bounds, when it is determined that a receiver has moved indoors or all received signals are simultaneously attenuated.

It will be appreciated that when certain phase parameters in Equation 3 are zero or known (e.g. from direct measurement, signal source selection or otherwise) then it may be possible to determine other unknown phase parameters, and their evolution in time, using the model of Equation 3. It may for example be possible to determine $v_r(t)$, for example, using hypothesis testing described below.

It will be appreciated that the Doppler phase $\Phi_{Doppler}(t_n)$ is dependent upon, inter alia, (in increasing specificity) movement of the receiver $v_r$; the movement of the receiver relative to the signal source $(v_s-v_r)$; the component $(v_u=(v_s-v_r)\cdot u)$ of the velocity of the receiver relative to the signal source along a defined direction u.

Phase Parameters

In order to refer to parameters coherently within this document, it is useful to classify the parameters that affect the total phase $\Phi(t_n)$ as phase parameters. These phase parameters may be referred to collectively as phase parameters p(t) or individually as a phase parameter NO where the index i indicates a type or class of parameter. The phase parameters p(t) may vary continuously with time, and are defined at each time $t_n$ where the time interval $t_{n-1}$ to $t_n$ corresponds to the radio sampling interval.

A receiver system parameter is a phase parameter NO that affects the phase of all received signals to the same extent.

The types of phase parameters p(t) may be classified as: $f_{Rerr}$ is an example of a receiver system parameter. It is a parameter that affects the phase $\Phi(t_n)$ of all signals received by the receiver to the same extent. It can be removed by applying the same time-varying phase sequence $\{\Phi_{f\_Rerr}(t_n)\}$ to all signals.

If there is a heading (orientation) error, there is a corresponding error in $v_r$ ($\Delta v_r$). This heading error is a parameter that affects the phase of all signals received by the receiver.

$v_r$ and $v_s$ are examples of kinematic parameters.

$v_r$ is an example of a receiver kinematic parameter, as is its related displacement parameter $\delta r_r$.

$v_s$ is an examples of a source kinematic parameter, as is its related displacement parameter $\delta r_s$.

The velocity of any object may be resolved into two parameters heading h and speed s for velocity-over-the-ground $v_r$.

u is an example of a direction of signal arrival parameter.

$u_{LOS}$ is a vector aligned along a line of sight and is an example that is both a vector parameter and a kinematic parameter (a relative displacement parameter) as it is defined by $r_s-r_r$ ($r_s$ is a displacement of the source of the digital signal and $r_r$ is a displacement of the receiver).

The evolution (variation in time) of the phase parameters p(t) over a time period such as a coherent integration time T may be represented by the multi-valued sequence $\{p(t_n)\}$.

The evolution (variation in time) of a particular phase parameter $p_i(t)$ over a time period such as a coherent integration time T may be represented by the multi-valued sequence $\{p_i(t_n)\}$.

One or more of the phase parameters may be provided in phase parameter information 361 to produce a phase-compensated phasor sequence 332.

The time-varying phase sequence may be applied before or after correlation. If applied after correlation it is likely to be a subsampled version of one that would be applied before correlation. In this case F(t) is approximated by a staircase function where F(t) is constant during each correlation code word correlation then jumps to the new value for the next one, and so on.

F(t) therefore varies over the coherent integration time and is based on a parametric model. The model does not dependent upon previous correlation results and can therefore be applied before any correlation has occurred.

Phasor Sequence

The phase sequence $\{\Phi(t_n)\}$ represents an evolution (variation over time) of the phase through the defined times $t_n$ during the time t=0 to t=T.

A complex phasor $X(t_n)$ represents a phase $\Phi(t_n)$ at a defined time $t_n$ $$X(t_n)=\exp(i\Phi(t_n)). \qquad\text{—Equation 7}$$

A phasor sequence $\{X(t_n)\}$ comprises multiple phasors $X(t_n)$ each representing a phase $\Phi(t_n)$ at a different defined time (Arg $(X(t_n))=\Phi(t_n)$).

$\{X(t_n)\}$ is the sequence of phasors $X(t_n)$ for each n where $1 \leq n \leq N$ and $N \geq 2$.

Each phasor $X(t_n)$ represents a phase compensation based upon the phase of the receiver at time $t_n$ that is applied to a corresponding sample of the correlation code 341. In this way, the correlation code 341 becomes phase-compensated when the correlation code 341 is combined with the phase-compensated phasor sequence 332.

A phasor X(t) is a transformation in phase space and it is complex valued, producing the in-phase component of the phase-compensated phasor sequence 332 via its real value and the quadrature phase component of the phase-compensated phasor sequence 332 via its imaginary value. The phasor X(t) is a cyclic phasor and may be expressed in a number of different ways, for example as a vector in the complex plane. The angle from the real axis to this vector is equal to the phase angle $\Phi(t)$ in radians and is positive valued for counter clockwise rotation. Although in this example, the phasor X(t) has a constant amplitude within the phase-compensated phasor sequence 332, in other examples, the phasor may represent both a rotation and a change in amplitude instead of just a rotation. However, in other examples, such as the one illustrated, the phasor is for rotation only.

Phase-Compensated Correlation

The complex correlation result R for the time interval $T_g-T_{g-1}$ is $$R_g=\int_{T_{g-1}}^{T_g} S(t)\cdot[X(t)\cdot C(t)]^* dt \qquad\text{—Equation 8}$$

where X(t) is the phasor, S(t) is the digital signal, and the correlation code word C(t) can be a single correlation code word or a concatenation of a base correlation code word for the received signal.

The time interval $T_g-T_{g-1}$ (the coherent integration time period) is equal to one or more correlation code durations and can be very long, for example many seconds of data (many thousands of correlation code words in length). The term-by-term multiplication of X(t).C(t) produces a phase-compensated correlation code that in certain circumstances may be re-used without recalculation. The asterisk in Equation 8 denotes the complex conjugate.

The signal S(t) may be any signal which has properties that allow correlation (i.e. have repetitive or predictable signal content, such as GNSS signals, cellular telecommunications signals, DVB-T signals, radar signals, sonar signals, etc). In some but not necessarily all examples, the signal source is a GNSS satellite.

Correlation may occur pre-acquisition or post-acquisition in a GNSS receiver. Acquisition refers to determining the code delay and carrier frequency of a received signal. In some examples, correlation may use the correlators of the GNSS receiver acquisition engine.

A phase sequence $\{\Phi(t_n)\}$ comprises multiple phase values $\Phi(t_n)$ for different times within a single correlation code word. A phase sequence $\{\Phi(t_n)\}$ represents an end-to-end multi-step directed (not random) path through a phase-time space. It has a sub-code word resolution (multiple different frequency values F(t) per correlation code word). The phase sequence $\{\Phi(t_n)\}$ is a known, assumed or modelled end-to-end multi-step path through a phase-time space and is assessed over its whole length T which is the time period of correlation (coherent integration).

It should be noted that the correlation performs coherent integration along the vector u. Signals that do not arrive along u do not coherently integrate for different positions of the receiver.

A Priori-Compensation

If the phase parameter sequence $\{p(t_n)\}$ for a received signal is known or assumed over a time period (e.g. T), then the phase sequence $\{\Phi(t_n)\}$ is precisely defined for that time period. This means that variations in the phase over that time period can be precisely compensated for reducing phase errors affecting the coherent integration (correlation). This allows the coherent integration time to be very significantly extended by using a correlation code word (e.g. a concatenated correlation code word) for the coherent integration. This in turn very significantly increases signal gain. Previously unusable signals can then be used.

Thus, if a correct phase sequence $\{\Phi(t_n)\}$ is used to create a correct phasor sequence $\{X(t_n),\}$ then extremely long coherent integration times of many correlation code word lengths may be used to increase gain.

The sensitivity of the correlation can be increased by increasing the length of phase sequence $\{\Phi(t_n)\}$ and the coherent integration time ($T=T_g-T_{g-1}$ in Equation 8). The sensitivity may be increased until weak signals can be seen above noise.

The most significant effects on the phase sequence $\{\Phi(t_n)\}$ during the coherent integration time T typically arises from instabilities in the receiver frequency reference (phase parameter $f_{Rerr}$) and a change in the relative position/orientation of the receiver to the signal source (phase parameters u and $v_r$).

The phasor sequence $\{X(t_n)\}$ may, in some examples, be a motion-compensated phasor sequence comprising motion-compensated phasors $X(t_n)$ based on a motion-compensated phase sequence $\{\Phi(t_n)\}$. The motion-compensated phase sequence $\{\Phi(t_n)\}$ is based upon an assumed or measured motion of the receiver such as, for example, $v_u(t)$ or $v_r(t)$ or $v_s(t)-v_r(t)$ or $v_r(t)\cdot u$. The motion-compensated phasor sequence $\{X(t_n)\}$ is based upon the motion-compensated phase sequence $\{\Phi(t_n)\}$. The phase sequence $\{\Phi(t_n)\}$ may be further compensated for errors and instabilities associated with the frequency references at both the transmitter and receiver, and other sources of phase error.

Parameter Calibration by Hypothesis Testing

A putative phase sequence $\{\Phi(t_n)\}$ can be used to create a putative phasor sequence $\{X(t_n)\}$ based on an hypothesis H and the resultant gain of the correlation result R or another assessment can be used to determine whether the putative phase sequence $\{\Phi(t_n)\}$ and phasor sequence $\{X(t_n)\}$ is a correct phase sequence $\{\Phi(t_n)\}$ and putative phasor sequence $\{X(t_n)\}$. It may be possible, in this way, to determine corresponding parameter sequences $\{p(t_n)\}$ for one or more of the phase parameters $p_i(t)$ that determine $\{X(t_n)\}$ and $\{\Phi(t_n)\}$ such as frequency $f_{Rerr}$, h, $v_r$, u, $v_s$, $\delta r_s$, $\delta r_r$ etc.

Parameters may vary on a very short timescale, such as within a phase sequence $\{\Phi(t_n)\}$. The parameters $p_i$ may vary continuously with time, and in some but not necessarily all examples are defined at each time $t_n$ where the time interval $t_{n-1}$ to $t_n$ corresponds to the radio sampling interval.

The method may, for example, comprise: causing correlation of multiple samples of a digital signal received by a receiver during a time period, via a communications channel, and the same correlation code compensated using different multiple putative phasor sequences to produce a correlation result for each different multiple putative phasor sequence, wherein each phasor sequence comprises multiple phasors representing different phases at different defined times during the time period, and the multiple putative phasor sequences are different in that each putative phasor sequence is based on a different hypothesis regarding the evolution of the frequency and phase through the defined times during the time period; and using the correlation results to determine a preferred hypothesis regarding evolution of the frequency and phase during the time period.

Different hypotheses are based on phase parameters of a parametric model of phase evolution (see Equation 3)

This may be extended to using multiple different phase sequences $\{\Phi(t_n)\}_k$ based on multiple hypotheses $\{H_k\}$ in parallel. Each different putative phase sequence $\{\Phi(t_n)\}_k$ can be used to create a putative phasor sequence $\{X(t_n)\}_k$ and the resultant gain of the correlation result $R_k$ or another assessment can be used to determine which of the multiple putative phase sequence $\{\Phi(t_n)\}_k$ (and phasor sequences $\{X(t_n)\}_k$) is a correct or, at least, a best phase sequence $\{\Phi(t_n)\}_\#$ (and putative phasor sequence $\{X(t_n)\}_\#$).

Thus the correlation results $R_k$ may be used to determine a preferred hypothesis $H_\#$ regarding evolution of the phase $\{\Phi(t_n)\}_\#$ during the time period of coherent integration. It may be possible, in this way, to determine corresponding preferred sequences for one or more of the phase parameters that determine $\{X(t_n)\}_\#$ and $\{\Phi(t_n)\}_\#$ such as receiver frequency error $\{f_{Rerr}\}_\#$, $\{v_r\}_\#$, $\{u\}_\#$, $\{v_s\}_\#$, $\{\delta r_s\}_\#$, $\{\delta r_r\}_\#$ etc.

The hypotheses $\{H_k\}$ may, for example, be based on the different evolutions (variations in time) of one or more phase parameters that are dependent upon a frequency deviation of the local oscillator of the receiver $\{f_{Rerr}\}$, orientation of the receiver over the time period $\{h\}$; movement of the receiver over the time period $\{v_r\}, \{\delta r_r\}$, movement of a source of the digital signals over the time period $\{vs\}$, relative position of the receiver and source over the time period $\{u\}$; the relative speed $v_u$ of the receiver towards the signal source.

The correlation results $R_k$ may be used to determine a preferred hypothesis $H_\#$ regarding the evolution of the phase $\{\Phi(t_n)\}_\#$ during the time period of coherent integration. A preferred correlation result is selected determining a corresponding preferred hypothesis regarding evolution of the phase during the time period.

In one example, one of the correlation results $R_{k=\#}$ is selected as one preferred correlation result and corresponding one preferred hypothesis $H_\#$ regarding evolution of the phase during the time period of coherent integration. This approach may, for example, be used when the phase sequences $\{\Phi(t_n)\}_k$ are based on estimated trajectories of the receiver as the hypotheses.

In another example, each hypothesis $H_k$ speculates that the receiver has moved a certain amount. This effectively hypothesises a sequence for $v_r(t)$. Different hypotheses are generated for different amounts of movement and also for different signal sources. In this example, for each movement hypothesis the corresponding correlation results $R_k$ for each of the multiple signal sources are combined to provide a joint score for each hypothesis over all signal sources. The hypothesis resulting in the highest joint score across the signal sources in use is selected as a preferred hypothesis $H_\#$ regarding movement of the receiver. Thus if calibrating a phase parameter (e.g. heading error) we have the correct one when all visible signal sources have maximum correlation results on their expected lines of sight.

The selection of a preferred correlation result or preferred correlation results may be based upon a comparison of the multiple respective correlation results to select one or more.

The selection may, for example, optimize a phase-dependent or motion-dependent parameter value.

Selection may for example optimize a maximum cumulative power for one signal source, for all signal sources or for a selected sub-set of signal sources.

In some circumstances the highest power may result from a directly received signal from the original signal source e.g. satellite. For example, it may be possible to consider only direct line of sight signals by constraining u to a range of values likely to be aligned with $r_s - r_r$, where $r_s$ is a vector displacement of the original signal source from an origin and $r_r$ is a vector displacement of the receiver from the origin.

In other circumstances the highest power may result from an indirectly received signal (a reflected signal). For example, it may be possible to consider only reflected signals by constraining u to a range of values not likely to be aligned with $r_s - r_r$.

In other circumstances the highest power may result from a signal sent by an unauthorised source (a spoofed signal). For example, it may be possible to recognise such a signal by constraining u to a range of values not likely to be aligned with $r_s - r_r$, or to filter out such a signal by constraining u to a range of values likely to be aligned with $r_s - r_r$.

Overview

The phase (motion) compensated correlation may involve constructing very large phase (motion)-compensated code words and then testing small variations in their construction, based on a parametric model of phase variation, in order to calibrate/update/monitor system parameters that are varying slowly. This is particularly effective in the presence of severe multipath and in difficult attenuation conditions such as indoors.

Small variations are adjustments expected to be the smallest adjustments that are large enough to elicit a change in result power that cannot be attributed to just measurement noise. By slightly adjusting the system parameters it is possible to maximise the power and maintain good calibration of the system parameters.

Varying slowly means varying slower than the sampling rate of the data signal. The variation may be modelled and predicted, for example, using a model in which a parameter varies linearly with time on the timescale of the coherent integration length T or using another model, for example, one in which a parameter (for example receiver frequency reference frequency error) varies as an n-order polynomial (where n is a value greater than or equal to 2). For example, the local receiver frequency reference might be exhibiting a gradual linear drift in frequency across the coherent integration time T or a polynomial drift in frequency across the coherent integration time T. For example the step length estimate might be too great by a fixed value. The step length may gradually shorten as the user gets tired, and this gradual shortening in step length will be over a timescale much greater than the coherent integration time T.

The "parametric model" refers to a set of equations which governs how our parametric information (e.g. sensor measurements) are translated into the time-frequency space, ultimately providing a (measurement-based) prediction of the frequency and phase evolution of the signal as received at the receiver. The equations may contain parameters—both time variant and invariant—the values of which are initially unknown or uncertain, but which may be determined/calibrated/optimised as described.

For example, if the measurements are accelerations and rotation rates from an inertial measurement unit attached to the receiver, the set of equations governing how these are translated first to velocities, and ultimately to Doppler frequency shifts, are the inertial navigation equations and various coordinate frame transformations. Parameters within the inertial navigation equations that may be optimised could include accelerometer and gyro biases, scale-factors and alignments. The optimisation of such parameters can be achieved by the methods described. The underlying set of equations, the model, does not change, meaning that our optimal frequency and phase evolution is always fully consistent with the physical model.

The construction of the large motion (or phase) compensated code words are based on (consistent with) underlying parametric models. The resultant frequency (and phase) evolution is entirely consistent with the underlying model, and cannot simply follow any path within the time-frequency space.

By performing the correlation in parallel for multiple different parameter sequences $\{p(t_n)\}$ over the time period one is performing the correlation using different hypotheses $H_k$ regarding the evolution of the phase through the time period. Each hypothesis $H_k$ is defined by a different phase parameter sequence $\{p(t_n)\}_k$.

Single Parameters

If one assumes that all phase parameters p(t) are known or well defined over the period T except for one parameter $p_i(t)$, then it may be possible to find the parameter sequence $\{p_i(t_n)\}$ over the period that optimizes R. The optimal value may be determined by optimising a score function based on the correlation results.

Further optimisation schemes may also be employed, including those that also weight the optimisation score using prior models and estimates of the errors associated with different measurements and parameters.

In one example, the optimal score may be found by determining where the correlation power is maximal. Depending on the scenario it may be desirable to find a local maximum, or the global maximum constrained by the parametric model. For example when using an attenuated LOS signal to calibrate a system parameter the local maximum is used, as the global maximum across the entire search space might be associated with a stronger reflected signal.

The hypothesis testing method involves correlation of a digital signal $\{S(t_n)\}$ received by a receiver during a first time period (e.g. t=0 to t=T), via a communications channel, and the same correlation code C(t) compensated using different multiple putative phasor sequences $\{X(t_n)\}_k$ to produce a correlation result $R_k$ for each different multiple putative phasor sequence $\{X(t_n)\}_k$.

Each phasor sequence $\{X(t_n)\}_k$ comprises multiple phasors $X(t_n)$ each representing a phase $\Phi(t_n)$ at a defined time $t_n$ during the first time period (t=0 to t=T).

The multiple putative phasor sequences $\{X(t_n)\}_k$ are different (index k) in that each putative phasor sequence $\{X(t_n)\}_k$ is based on a different hypothesis $H_k$ regarding the evolution of the phase sequence $\{\Phi(t_n)\}_k$ through the defined times $t_n$ during the first time period.

The method uses the correlation results $R_k$ to determine a preferred hypothesis $H_\#$ regarding evolution of the phase sequence $\{\Phi(t_n)\}_\#$ during the first time period.

Each phase sequence $\{\Phi(t_n)\}_k$ comprises multiple phase values $\Phi(t_n)$ for different times $t_n$ within a single correlation code or concatenated correlation code. It represents an end-to-end multi-step path through a phase-time space. The hypothesis $H_k$ (defined by parameter sequence $\{p(t_n)\}_k$) represents a model of a possible end-to-end multi-step path through a phase-time space which is assessed over its whole length simultaneously. An assumed or measured model (multi-step path) of phase sequence $\{\Phi(t_n)\}_k$ over time is used rather than a brute force exhaustive search. The model defines the evolution of the phase value $\Phi(t_n)$ during the time period of correlation (coherent integration) such that optimisation of the correlation result is at all times constrained by and consistent with the underlying model.

Multiple Signals

In some instances the optimum phase parameter sequence $\{p_i(t_n)\}_\#$ may be determined using a single signal source where the signal received is strong enough. The single signal source used may be a selected one of the signal sources available or the only signal source available.

The optimum phase parameter sequence $\{p_i(t_n)\}_\#$ may be determined using multiple signal sources. The multiple signal sources used may be all of the signal sources available or a selected sub-set of the available signal sources.

For example, a sub-set of the available signal sources may be selected by selecting those signal sources that have a maximum correlation result for the same k (i.e. for the same hypothesis $H_k$ as applied differently to each received signal).

Multiple signal sources may be used to determine the optimum phase parameter sequence $\{p_i(t_n)\}_\#$ by considering the correlation results $R_k$ for each signal source.

For example, optimum phase parameter sequence $\{p_i(t_n)\}_\#$ may be determined by identifying that multiple signal sources have a maximum correlation result max $R_k$ for the same k (i.e. for the same hypothesis $H_k$ as applied differently to each received signal which provides the optimum k=# defining $\{p_i(t_n)\}_\#$).

In one example, $\{p_i(t_n)\}$ may be found separately for each signal source by determining the value of $H_k$ where the power is maximal for each signal. For example one can use a numerical optimisation method to maximise the coherent correlation value for a set of possible phase parameter sequences, i.e. $\{p_i(t_n)\}_\# = \text{argmax}_{\{p_i(t_n)\}_k} |R_k^{(l)}|$ were l is the signal source under consideration, and where argmax in this instance is a function which returns the parameter sequence $\{p_i(t_n)\}_\#$ resulting in the maximum correlation value.

In some examples, $\{p_i(t_n)\}$ may be found collectively for multiple signals by determining the value of $H_k$ where the combined power of the signals is maximal, i.e. $\{p_i(t_n)\}_\# = \text{argmax}_{\{p_i(t_n)\}_k} \Sigma_l |R_k^{(l)}|^2$. Here the objective function is the total signal power, using the non-coherent correlation of the individual signals. It will be appreciated that other object functions, for example using the coherent total correlation of the signals, could be used.

Multiple Parameters

The optimisation described above considers optimisation of a single phase parameter. It is also possible to perform such optimisation simultaneously over two or more parameters.

If one assumes that all phase parameters p(t) are known or well defined over the period T except for a plurality of parameters $p_i(t)$, then it may be possible to find the phase parameter sequences $\{p_i(t)\}$ over the time period that optimizes R.

For simplicity of explanation the plurality of parameters NO, will be referred to as parameters $p_1(t)$ and $p_2(t)$. However, it should be recognised that in some but not necessarily all examples, the plurality of parameters NO may be more numerous than two.

By performing the correlation in parallel for multiple different parameter sequences $\{p_1(t_n)\}_j$, $\{p_2(t_n)\}_k$ over the time period, one is performing the correlation using different hypothesis $H_{j,k}$ regarding the evolution of the phase through the time period. Each hypothesis $H_{j,k}$ is defined by a different combination $\{p_1(t_n)\}_j$ $\{p_2(t_n)\}_k$ of sequence $\{p_1(t_n)\}_j$ and simultaneously $\{p_2(t_n)\}_k$ In one example it is possible to find the optimum combination of parameter sequences ($\{p_1(t_n)\}_\#$, $\{p_2(t_n)\}_\#$) that produces the optimum phase sequence $\{\Phi(t_n)\}_\#$ by maximising the total non-coherent sum of the correlation power over all signal sources ($\{p_1(t_n)\}_\#$, $\{p_2(t_n)\}_\#$)=arg $\max_{\{p_1(t_n)\}_j,\{p_2(t_n)\}_k} \Sigma_l |R_{j,k}^{(l)}|^2$ while the signal sources and receiver are in relative motion. This may be detected or assumed, for example, because the signal sources are in constant motion (e.g. GNSS satellites).

Approach

The hypothesis testing method involves correlating a sequence $\{S(t_n)\}$ of a digital signal received by a receiver during a first time period (e.g. t=0 to t=T), via a communications channel, and the same correlation code C(t) compensated using different multiple j,k putative phasor sequences $\{X(t_n)\}_{j,k}$ to produce a correlation result $R_{j,k}$ for each different multiple putative phasor sequence $\{X(t_n)\}_{j,k}$ Each phasor sequence $\{X(t_n)\}_{j,k}$ comprises multiple phasors $X(t_n)$ each representing a phase $X(t_n)$ at a defined time $t_n$ during the first time (t=0 to t=T).

The multiple j,k putative phasor sequences $\{X(t_n)\}_{j,k}$ are different (indices j,k) in that each putative phasor sequence $\{X(t_n)\}_{j,k}$ is based on a different hypothesis $H_{j,k}$ regarding the evolution of the phase $\{\Phi(t_n)\}_{j,k}$ through the defined times $t_o$ during the time period.

The method uses the correlation results $R_{j,k}$ to determine a preferred hypothesis $H_\#$ regarding the evolution of the phase $\{\Phi(t_n)\}_\#$ during the time period of coherent integration (correlation) T.

Each phase sequence $\{\Phi(t_n)\}_{j,k}$ comprises multiple phase values $\Phi(t_n)$ for different times $t_n$ within a single correlation code or concatenated correlation code. It represents an end-to-end multi-step path through a phase-time space. The hypothesis $H_{j,k}$ (defined by the parameter sequence combination $\{p_1(t_n)\}_j$, $\{p_2(t_n)\}_k$) represents a model of a possible end-to-end multi-step path through a phase-time space which is assessed over its whole length simultaneously. An assumed or measured model (multi-step path) of phase value $\Phi(t_n)$ over time is used rather than a brute force exhaustive search. The model defines the evolution of the phase value $\Phi(t_n)$ during the time period of correlation (coherent integration) such that optimisation of the correlation result is at all times constrained by and consistent with the underlying model.

Applications

Phase-compensated correlation can provide high confidence about certain phase parameter values p(t) such as heading and local oscillator offset with much less data than competing techniques, because the data provided by phase-compensated correlation has a much higher signal strength and is much cleaner (multipath mitigated). Phase-compensated correlation can make use of very weak signals in difficult environments where standard methods cannot work as such methods are unable to extract any signal whatsoever. Phase-compensated correlation also works in completely benign signal environments with unobstructed line of sight to signal sources.

An optimum phase parameter sequence $\{p_i(t_n)\}_\#$ can be calculated using different objective functions and optimisation criterion for different applications.

The optimum phase parameter sequence $\{p_i(t_n)\}_\#$ may for example be a kinematic parameter sequence, for example a receiver kinematic parameter sequence or a relative displacement kinematic parameter sequence.

The optimum phase parameter sequence $\{p_i(t_n)\}_\#$ may be used for determining a trajectory of the receiver for example $\{v_r(t_n)\}$ when $p_i(t)=v_r(t)$. The sequence $\{v_r(t_n)\}$ may also be determined by differentiating $\{r_r(t)\}$.

The optimum phase parameter sequence $\{p_i(t_n)\}_\#$ may be used for determining a position of the receiver $\{r_r(t_n)\}$ when $p_i(t)=r_r(t)$ The sequence $\{r_r(t_n)\}$ may also be determined by integrating $\{v_r(t_n)\}$).

The optimum phase parameter sequence $\{p_i(t_n)\}_\#$ may be used for determining the length of a step taken by a user carrying the receiver $\{\delta r_{step}(t)\}$ when $p_i(t)=\delta r_{step}(t)$. User step length $\delta r_{step}$ is fundamental to the good operation of personal dead-reckoning navigation. $\delta r_{step}$ is the distance travelled over the ground between step events (where step events may be detected, for example, from accelerometer traces).

The optimum phase parameter sequence $\{p_i(t_n)\}_\#$ may be used for determining a heading of the receiver $\{h(t_n)\}$ when $p_i(t)=h(t)$. For example, considering a GNSS (such as GPS) a heading error between the frame of reference of inertial sensors in the receiver, and the frame of reference defined by the GNSS satellites, can be resolved with 1 second of data and as little as a few tens of centimetres of motion.

The optimum phase parameter sequence $\{p_i(t_n)\}_\#$ may be used for determining line of sight $u_{LOS}$ when $p_i(t)=u$. If the phasor sequence, associated with a trial direction of signal arrival u, results in signal detection, then a signal is arriving from that direction. If this direction corresponds to the expected light of sight direction $u_{LOS}$ then we can treat this signal as the direct path from the signal source. If test u vectors in other directions result in signal detection, this may indicate that the received signal is a reflected signal or a spoofed signal. The identification of a signal as a reflected signal or spoofed signal may enable it to be excluded from use (rejected).

The optimum phase parameter sequence $\{p_i(t_n)\}_\#$ may be used to calibrate initial conditions, biases and offsets for different systems/system components (e.g. inertial sensors, frequency references, Attitude and Heading Reference System (AHRS), compasses, other RF-based navigation aids). There is no need for the receiver to be static during the process and there is no need for the user to follow a defined procedure. The process may be transparent to a user of the receiver (not involve the user).

Examples of components that can be calibrated include one or more of: frequency oscillators which may enable the use of low-cost frequency oscillators, human step measuring sensor, inertial sensors, magnetometers, gyroscopes and accelerometers.

The optimum $\{p_i(t_n)\}_\#$ may be used for determining an oscillator/frequency reference frequency error of the receiver when $p_i(t)=f_{Rerr}(t)$.

Use Cases

Motion-compensated correlation (see Equation 6) couples to energy from a certain direction and washes out the energy in other directions (when the receiver is moving).

A smartphone may be placed at an arbitrary orientation relative to the actual direction of motion, for example when in a pocket or bag. The offset between the smartphone compass heading and the actual user motion heading needs to be determined to allow human motion modelling to assist trajectory reconstruction. We note this heading error term h While the user is moving outside and GNSS signals are readily available at standard signal level, a range of trial trajectories similar to the initial heading estimate and representing a range of heading estimates can be tested using supercorrelation, with the joint gain of the receiver GPS signal correlation peaks over all incoming signals giving the metric for optimisation.

Supercorrelation refers to using a phasor sequence $\{X(tn)\}$ comprising multiple phasors $X(tn)$ each representing a phase $\Phi(tn)$ that has a length longer that the correlation code word length. For example, if one were doing a 1 second supercorrelation then one might use an inertial measurement unit running at 100 Hz to create a vector of 100 velocity values across the desired 1 second of time. One then interpolates that to give us as many velocity values as there are radio samples in that 1 second. Now in this "trial trajectories" aspect we choose to geometrically rotate the velocity sequence about a fixed point in order to test a bunch of heading corrections (a bunch of slight variations to the inertial measurement unit heading estimating).

By using all signals jointly the method is robust to multipath interference and reflected signals because only the true heading estimate will result in a simultaneous summing of the energy from all signal sources in a single score value for that orientation.

Alternatively a simple linear compression or dilation of the trajectory in the direction of each signal source can be tested by adjusting a fixed frequency offset added to the base frequency used to generate the Supercorrelation phasor sequence. By optimising for each signal source b=1, 2 . . . B in this manner, a set of B simultaneous equations can be constructed where the free parameter h is the heading error to be calibrated, and the input measurements to the equation set are the frequency shifts determined by performing this process for each transmitter. These are just two examples of the optimisation methods that might be employed but are not expected to be an exhaustive list.

The benefit of this approach over existing methods is the multipath mitigation and signal boosting. Both mean we can calibrate more confidently and with less data when in difficult signal environments (LOS plus reflections, some signals not LOS, etc).

Plotting the supercorrelation gains of the correlator at a given moment for some long phase compensation sequence (e.g. 1 second) and testing a range of some parameter of interest; in this example, varying a small constant term $f_{test}$ being added to the frequency sequence F(t) predicted for the incoming signal. The power of the correlation result will be maximum at the correct $F(t)+f_{test}$ estimate. If the system is well calibrated then $f_{test}$ will be zero, or very close to zero within measurement noise, for each incoming signal. If there is a common $f_{test}$ for each signal then there is a common frequency error (e.g. a local frequency reference frequency offset). This common frequency error can be estimated by taking the mean of the $f_{test}$ values produced by each signal. If the $f_{test}$ values are distinctly different for each signal, then there is at least one parameter needing calibration that is not a common error. In some cases the distribution of the $f_{test}$ values from each incoming signal can be mapped directly back to the parameter of interest. A heading error is an example of such a term, since there is a direct mapping between a receiver heading error and a trigonometric correction in all line-of-sight vectors between the receiver and all sources. Note that estimating the heading error in this way may still leave a residual, common non-zero value of $f_{test}$. In this case it is likely that the remaining value of $f_{test}$ represents a receiver frequency error $f_{Rerr}$.

In this way multiple parameters can be calibrated at the same step by exploiting the signal geometry and knowing that some parameters will cause common errors to all signal source channels (such as the receiver frequency error and others $f_{Rerr}$) and others will cause a particular non-common-to-all pattern of errors that allow the parameter error in question to be observed and tuned.

In a system that is not well calibrated there are errors in the predicted phases used for correlation. Since these values are predicted using a range of other parameters (receiver location, receiver time, satellite orbit data, receiver frequency reference error estimate, receiver-motion estimate) we can use this distribution of errors across the satellite measurements to optimise out an error in a parameter known to be the likely source of error.

We can additionally or alternatively perform hypothesis testing for the parameters of interest. For example, instead of shifting the phase-compensated phasor sequences to then infer corrections to the underlying system parameters, we can instead change the underlying system parameters to directly calculate bespoke phase-compensated phasor sequences for each hypothesis (e.g. heading offset estimate) and determine the best hypothesis as described above.

In the scenarios where the effects of all frequency reference-related frequency errors are absent or have been compensated, the sequence of phases $\{\Phi(t_n)\}$ used in the calculation of the phase-compensated phasor sequence $\{X(t_n)\}$ are determined by a sequence of velocities $\{v_u(t_n)\}$ that represent an hypothesis regarding evolution of the Doppler frequency shift during a first time period t=0 to t=T. Selection of the correlation result with the highest cumulative power, selects the corresponding hypothesis regarding evolution of the Doppler frequency shift during the first time period as the best hypothesis. The corresponding sequence of velocities $\{v_u(t_n)\}$ that represents the best hypothesis is also identified and may be used to calculate a changing position of the receiver.

Multipath Interference and Signal Selection

The preceding paragraphs have described phase-compensated correlation of one or more signals from one or more sources. The selection of which signal or signals to use may be based on one or more criteria.

It may, for example, be desirable to discriminate between line of sight signals and reflected signals from the same signal source. Reflected signals suffer from a delay. This delay may be modelled as an unknown offset in phase.

It may be possible to disambiguate between a line of sight signal and a reflected signal because the line of sight signal has least delay and the different paths have different delay. This disambiguation is possible using traditional correlation methods when the delay is greater than the coherence length of the signal. The coherence length is related to the bandwidth of the signal, and for GPS L1 signals is approximately 300 metres. Phase-compensated correlation codes (Supercorrelators) that couple strongly to the line of sight signals can be used to attenuate reflected signals thereby removing multipath interference, even from reflected signals with much shorter delays than the coherence length of the signal.

It may also be possible to disambiguate between line of sight signals and first reflected signals that have arrived by a similar but not the same first path and second reflected signals that have arrived by a similar but not the same second path because the line of sight signals have least delay and the first reflected signals as a group have a delay that is different from the second reflected signals as a group. By identifying such groupings it is possible to select or exclude from selection signals that have arrived within certain delays.

It is possible to compensate for a group delay by applying a common phase offset before or after motion-compensated correlation. The use of motion-compensated correlation applied to a sub-set of the received signals that have a similar group delay may increase signal to noise ratio and enable determination of one or more phase parameters which may then be used to further improve signal to noise.

In some circumstances, instead of compensating for a group delay, the source signals of different groups may be treated as signals from different sources.

It may, additionally or alternatively, be desirable to discriminate between signals from the same signal source received from different directions. The use of phase-compensated correlation using different u may be used for this purpose. It may be desirable for the receiver to be moving so that there are significant phase changes for relatively small changes in the orientation of u.

This may be used to discriminate between a line of sight signal and a reflected signal.

This may also be used to discriminate between a signal received from an expected direction and a signal received from an unexpected direction. This may enable the signal from the unexpected direction to be rejected as a spoofed signal.

It may for example be desirable to select a particular source of signals because its line of sight vector $u_{LOS}$ has a certain orientation relative to the receiver or its position and/or movement has some other relationship to position and/or movement of the receiver.

Multipath

It may, in some circumstances be desirable to use (select) the strongest signal whether or not it is a reflected signal. A reflected signal has an unknown delay but may be used (selected) for phase-compensated correlation (and determination of the delay using correlation). For example, a reflected signal can still be useful in determining the local frequency reference error.

It may, in some circumstances be possible to use (select) multiple reflected signals even with extreme delays (such as a delay longer in time than the inverse of the signal bandwidth) when the selected multiple reflected signals received have equivalent delays. In such a circumstance the delayed signal can still be useful in determining the local frequency reference error. Examples have been given above on how to determine such an offset error.

The selection of a reflected signal for use may occur before phase-compensated correlation (if there is sufficient information to discriminate the signal) or after phase-compensated correlation.

It may, in some circumstances be desirable to use (select) the strongest signal line of sight signal(s).

Sample Selection

In some circumstances it may not be desirable to perform a correlation, for example a phase-compensated correlation, for every sample of the received signal. A selection process may occur to determine which sub-set of the samples of the received signal are to be used or not used, or to determine periods of time during which it is decided that correlation is carried out or not carried out.

In one example, the selection may be that intermittent samples are correlated. This may be used to reduce processing power. When applied to phase-compensated correlation it may be used to obtain some of the benefits of long term coherent integration but at a coarser scale than at each sample.

In one example, the selection may be that one or more samples are not used for phase-compensated correlation or that the result of phase-compensated correlation is not used for those one or more samples. For example, if there is detection of an anomaly (an event that interferes with phase-compensated correlation) for a certain time period (unused time period) then the samples coinciding with that anomaly (coincident samples) may not be used (not used for phase-compensated correlation or the result of phase-compensated correlation is not used for those one or more samples). In one example, an accelerometer profile may be used to identify a period of time when there is rapid acceleration or deceleration which may impact operation of a crystal oscillator and then not use the coincident samples for that period of time. In another example, periods when a heel strike occurs while a person carrying the receiver is walking may be used to determine time periods for which coincident samples are not used. In another example, very rapid turns, may result in inaccurate readings from a gyroscope.

An anomaly may be used to calibrate a parameter value of the parametric model. For example shocks can introduce a phase change in the receiver frequency reference (local oscillator). The magnitude of the strike measured by an accelerometer could be used to correct the frequency of the receiver frequency reference (local oscillator). The accelerometer may be used to infer the shock-dependent variations in the receiver frequency reference output.

Parameter Calibration by Signal Selection

The phase depends on $v_u = (v_s - v_r) \cdot u$.

Assuming $f_{Serr}$ and $f_{Rerr}$ are zero or compensated for, if the signal is selected and motion of the receiver controlled or directed such that $v_s$ (the signal source velocity) and $v_r$ (the receiver velocity) are orthogonal and $v_r$ is along $u_{LOS}$ then the phase is linear in $v_r$. Therefore correlation of a signal from the source may provide $v_r$ if the receiver moves relative to the source.

Alternatively a source may be selected whose motion vs is orthogonal to u e.g. an overhead GNSS satellite.

Alternatively a motion of the receiver may be controlled or directed such that it has motion $v_r$ orthogonal to u or such that $v_s - v_r$ is orthogonal to u.

Parameter Variation Modeling

It may be desirable to model the time evolution of a phase parameter, so that the model can be used to provide phase parameter values for each data sample, For example, measurements may be made of the phase parameter value less often than each data sample and those measurements may be used to calibrate a model of time evolution of the phase parameter.

The measurements and calibration may, for example, be made intermittently according to a schedule, for example periodically or according to some other criteria, for example based on a stability of a phase parameter measurement system.

In one example, the receiver frequency reference frequency error (and consequently the phase variation arising from it) may be modelled as a linear equation in time t or a polynomial equation of order n in time t, where n is equal to or greater than 2.

By performing multiple distinct measurements of the receiver frequency reference frequency error, it is possible to define the polynomial equation.

The receiver frequency reference frequency error may, for example, be measured using hypothesis testing, motion-compensated correlation of a good signal or correlation of a signal from an unobstructed satellite, for example an overhead satellite.

The measurements and calibration of the polynomial for the receiver frequency reference frequency error may, for example, be made intermittently according to a schedule, for example periodically or according to some other criteria, for example, based on stability of the receiver frequency reference. For example, a significant change in ambient temperature may trigger a definition or redefinition of the polynomial defining the receiver frequency reference frequency error.

In some examples, the order n may be fixed. In other examples, the order n may be variable.

Long Codes

Figure 5:
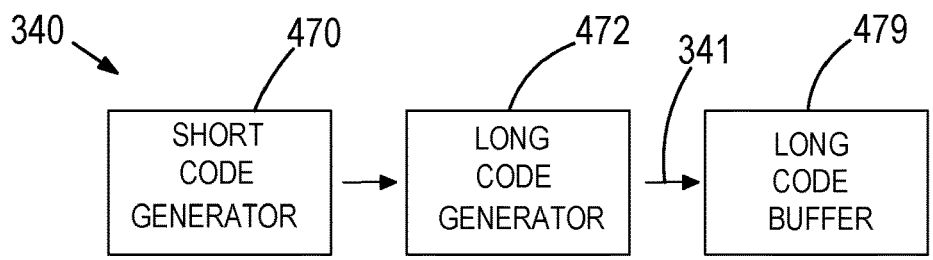
FIG. 5 illustrates an example of a long correlation code generator.
Figure 6:
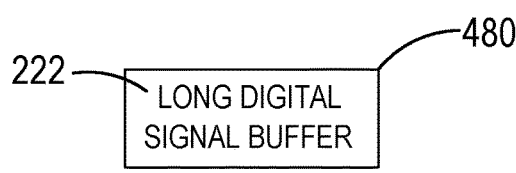
FIG. 6 illustrates an example of a long digital signal buffer.

FIG. 5 illustrates an example of a correlation code generator 340 that provides a correlation code 341 that may be used for correlation as described above. The correlation code 341 is a long correlation code as described below. A short code generator 470 produces a correlation code 341'. A long code generator 472 concatenates the correlation code 341' multiple times to produce the long correlation code 341. The long correlation code may be stored in a buffer memory 474 that is of sufficient size to temporarily store a concatenation of multiple correlation codes 341'. FIG. 6 illustrates an example of a long digital signal buffer 480 that temporarily stores a received digital signal 222 that may be used for motion-compensated correlation as described above. This is a buffer memory 474 that is of sufficient size to temporarily store received digital signal 222 that has a duration as long as the long correlation code 341.

The digital signal 222 is a long digital signal, the correlation code 341 is a long correlation code, the phase-compensated correlation code 322 is a long phase-compensated correlation code.

The long digital signal 222, the long correlation code 341 and the long phase-compensated correlation code 322 have the same length. Each having a duration greater than a length of the correlation code word e.g. greater than 1 ms for GPS or greater than 4 ms for GALILEO. For example, the duration may be N*1 ms or M*4 ms where N, M are natural numbers greater than 1. It may in some examples be possible to change the duration, for example, in dependence upon confidence of receiver-motion measurement when performing motion-compensated correlation. It may in some examples be possible to increase and/or decrease N or M. It may in some examples be possible to select between having a duration N*1 ms or M*4 ms. A longer duration increases correlation time providing better gain.

The long correlation code 341 is a concatenation of multiple ones of a same first correlation code 341'.

The first correlation code 341' may be a standard or reference code e.g. a Gold code, Barker code or a similar that has a fixed period T and predetermined cross-correlation properties.

A long phase-compensated correlation sequence 422 may be referred to as a supercorrelation sequence. A supercorrelation sequence may be a long phase-compensated phasor sequence or a long phase-compensated correlation code (phasor adjusted).

Figure 7:
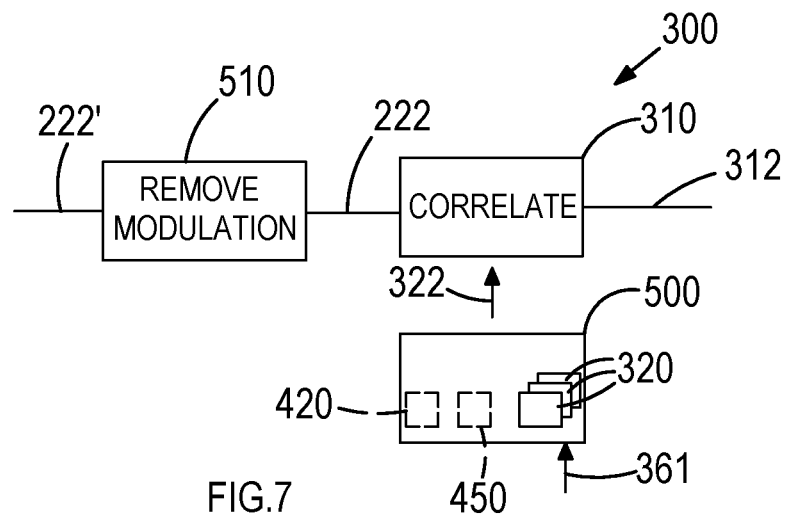
FIG. 7 illustrates an example of a phase-compensated correlator.

FIG. 7 illustrates an example of a phase-compensated correlator 300 comprising multiple phase-compensated correlation sequence (PCCS) generators 320.

The phase-compensated correlator 300 may also optionally comprise a phase-compensated correlation sequence system 500 comprising a phase-compensated correlation sequence (PCSS) storage system 420, a phase-compensated correlation sequence (PCCS) re-use system 450 and multiple phase-compensated correlation sequence (MCCS) generator 320.

The PCCS re-use system 450 determines if and what phase-correlation should be performed on a received digital signal 222, The PCCS re-use system 450 receives as an input the parameter information 361 which may be used to determine whether a current in use phase-compensated correlation sequence 422 should be re-used for phase-compensated correlation of a received digital signal 222 (re-use current), and/or whether a previously used/stored phase-compensated correlation sequence 422 should be re-used/used for phase-compensated correlation of a received digital signal 222 (PCCS access) and/or whether a new phase-compensated correlation sequence 422 should be generated for phase-compensated correlation of a received digital signal 222 (PCCS generation) and/or whether phase-compensated correlation of a received digital signal 222 should be suspended (suspend).

In some but not necessarily all examples, if the parameter information 361 is determined to represent a state (e.g. an assumed or measured movement of the receiver 200) that is the same as or corresponds to the immediately preceding state (e.g. an assumed or measured movement of the receiver 200) then it may be determined that the phase-compensation for the receiver 200 is invariant (repeated) and the currently used phase-compensated correlation sequence 422 may be re-used via the re-used.

In some but not necessarily all examples, if the parameter information 361 is determined to represent a state (e.g. an assumed or measured movement of the receiver 200) that is the same as or corresponds to a state (e.g. an assumed or measured movement of the receiver 200) for which there exists a stored phase-compensated correlation sequence 422 associated with that state then that stored phase-compensated correlation sequence 422 is accessed in the addressable memory and used via the PCCS storage system 420. The accessed stored phase-compensated correlation sequence 422 may be a previously used and/or previously generated phase-compensated correlation sequence 422. It may have been stored by the PCSS storage system 420 in an addressable memory for re-use.

Each of the multiple phase-compensated correlation code generators 320 generates a long phase-compensated correlation code 322 which is a long correlation code 341 that has been compensated, before correlation, using the same long phase-compensated phasor sequence 332.

A first one of the multiple phase-compensated correlation code generators 320 produces an early long phase-compensated correlation code 322 which is a long correlation code 341 that has been compensated, before correlation, using the same long phase-compensated phasor sequence 332 and time shifted to be early.

A second one of the multiple phase-compensated correlation code generators 320 produces a present (prompt) long phase-compensated correlation code 322 which is a long correlation code 341 that has been compensated, before correlation, using the same long phase-compensated phasor sequence 332.

A third one of the multiple phase-compensated correlation code generators 320 produces a late long phase-compensated correlation code 322 which is a long correlation code 341 that has been compensated, before correlation, using the same long phase-compensated phasor sequence 332 and time shifted late.

Each of the early long phase-compensated correlation code, present (prompt) long phase-compensated correlation code and late long phase-compensated correlation code are separately correlated with the same long digital signal 222.

The phase-compensated correlator 300 is suitable for use in a global navigation satellite system (GNSS) where the received digital signal 222 is transmitted by a GNSS satellite. The phase-compensated correlator 300 may be part of a GNSS receiver 200.

In some but not necessarily all examples, down-conversion of a received signal before analogue to digital conversion to create the digital signal 222 occurs, in other examples it does not. Where down-conversion of a received signal before analogue to digital conversion to create the digital signal 222 occurs, in some but not necessarily all examples, the down-conversion is independent of a measured movement of the receiver 200 and is not controlled in dependence upon the measured movement of a receiver 200 of the received signal.

In some but not necessarily all examples a modulation removal block 510 may remove any data that has been modulated onto the signals being coherently integrated using the phase-compensated correlator. An example of this is the removal of the navigation bits from a received GNSS digital signal 222' to produce the digital signal 222 processed by the phase-compensated correlator 300.

In this example, the correlation code concatenated to produce the long correlation code 341 is a chipping code or a pseudorandom noise code. It may for example be a Gold code.

Each GNSS satellite may use a different long correlation code 341 in some examples. Multiple phase-compensated correlators 300 may be provided and may be assigned to different satellites. A phase-compensated correlator 300 then performs phase-compensated correlation for the assigned GNSS satellite.

Figure 8:
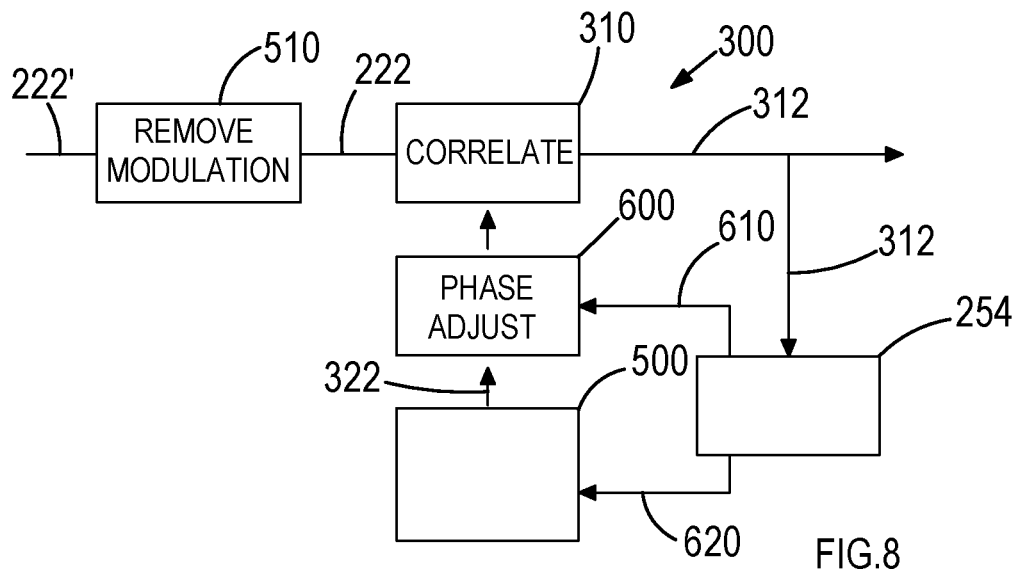
FIG. 8 illustrates an example of a phase-compensated correlator.

In some examples, movement of the assigned satellite may be compensated by using the line of sight relative velocity $v_u$ between the receiver 200 and the assigned satellite. In other examples, movement of the assigned satellite may be compensated by using closed control loop as illustrated in FIG. 8. Correlating the digital signal 222 provided by the receiver 200 with the long phase compensated correlation code 322 additionally uses one or more closed control loops 610, 620 for maintenance of code-phase alignment and/or carrier-phase alignment 620.

A control system 254 uses the results 312 of phase-correlated correlation to provide a closed-loop control signal 610 and/or a closed loop control signal 620.

A closed-loop control signal 610 controls a phase adjust module 600 to adjust the phase of the phase-compensated correlation codes 322 to maintain carrier phase alignment.

A closed-loop control signal 620 controls each of the multiple phase-compensated correlation code generators 320 for the satellite to maintain code phase alignment.

Figure 9:
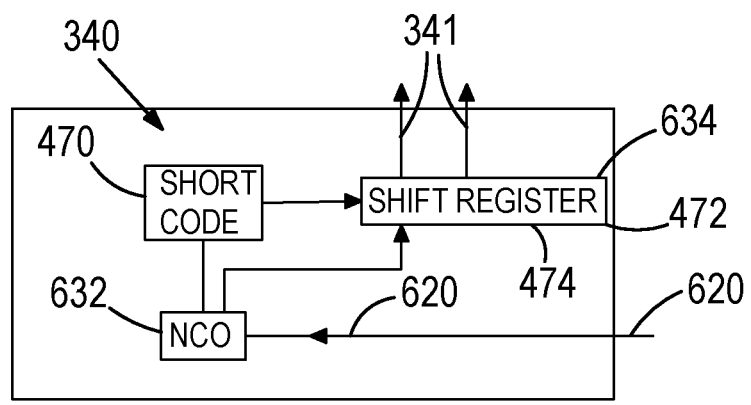
FIG. 9 illustrates an example of a phase-compensated correlation code generator.

FIG. 9 illustrates an example of how phase-compensated correlation code generators 320 may maintain code-phase alignment via a closed loop control signal 620. A numerical controlled oscillator 632 receives the control signal 620 and controls the long correlation code generator 340 using the short code generator 470 and a shift register 634 that buffers the long correlation code 341 and simultaneously operates as long code generator 472 and long code buffer 474 for the multiple phase-compensated correlation code generators 320 used for a particular signal source e.g. satellite.

Figure 10A:
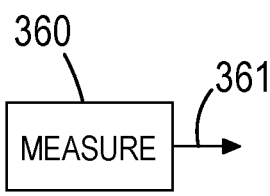
FIGS. 10A and 10B illustrate different examples of a receiver-motion module for producing a movement signal.
Figure 10B:
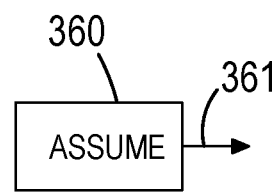

FIGS. 10A and 10B illustrate different examples of a phase parameter module 360 for producing phase parameter information 361, for example, indicative of one or more time-varying parameters $\{p_i(t_n)\}$.

For example in some but not necessarily all examples, FIGS. 10A and 10B illustrate different examples of a receiver-motion module 360 for producing a movement signal 361 indicative of a movement of the receiver 200 during a particular time duration. The receiver-motion module 360 illustrated in FIG. 10A produces a movement signal 361 indicative of a measured movement of the receiver 200. The receiver-motion module 360 illustrated in FIG. 10B produces a movement signal 361 indicative of an assumed movement of the receiver 200.

The movement signal 361 may be a parameterized signal defined by a set of one or more parameters.

The receiver-motion module 360 may, for example, be used to determine a velocity of a pedestrian or a vehicle The receiver-motion module 360 that measures the receiver movement as illustrated in FIG. 10A may have a local navigation or positioning system that tracks motion of the receiver 200, such as a pedestrian dead reckoning system, an inertial navigation system, a visual tracking system, or a radio positioning system An inertial navigation system typically calculates velocity by integrating acceleration measurements from inertial sensors such as multi-axis accelerometers and gyroscopes.

A pedestrian dead reckoning system may detect a step from for example a heel strike, estimate step/stride length, estimate a heading, and determine a 2D position.

A radio positioning system may, for example, use Wi-Fi positioning and/or Bluetooth positioning.

The receiver-motion module 360 that assumes the receiver movement, illustrated in FIG. 10B, may have a context detection system that detects a context of the receiver 200 such as a specific location at a specific time and determines a receiver velocity on a past history of the receiver velocity for the same context. A learning algorithm may be used to identify re-occurring contexts when the receiver velocity is predictable and to then detect that context to estimate the receiver velocity.

In other examples, FIGS. 10A and 10B may illustrate different examples of a phase parameter module 360 for producing a phase parameter signal 361 indicative of a time-varying parameter $\{p_i(t_n)\}$. For example, the phase variation due to receiver frequency reference frequency error $\{\Phi_{f\_Rerr}(t_n)\}$.

As previously described, it may be desirable to model the time evolution of a phase parameter, so that the model can be used to provide phase parameter values for each data sample.

Figure 11:
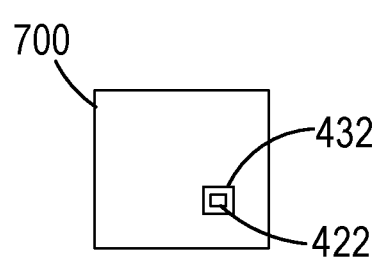
FIG. 11 illustrates an example of a record medium.

FIG. 11 illustrates an example of a record medium 700 such as a portable memory device storing a data structure 432. The data structure 432 comprises: a phase-compensated correlation sequence 422 that is a combination of a (long) correlation code 341 and a (long) phase-compensated phasor sequence 332 or is a (long) phase-compensated phasor sequence 332. The record medium 700 and the data structure 432 enables transport of the phase-compensated correlation sequence 422. The data structure 432 may be configured as a data structure addressable for read access using a motion-dependent index.

In some but not necessarily all examples, the long phase-compensated correlation sequence 422 is a combination of a long correlation code 341 and a long phase-compensated phasor sequence 332 and the long correlation code 341 is a concatenation of multiple ones of the same standard correlation code.

A controller 800 may be used to perform one or more of the before described methods, the before described blocks and or all or part of a phase-compensated correlator 300.

Implementation of a controller 800 may be as controller circuitry. The controller 800 may be implemented in hardware alone, have certain aspects in software including firmware alone or can be a combination of hardware and software (including firmware).

Figure 12B:
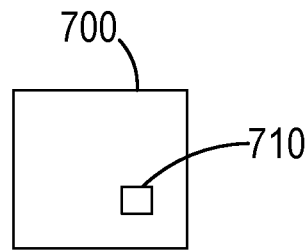
FIG. 12B illustrates an example of a computer program.
Figure 12A:
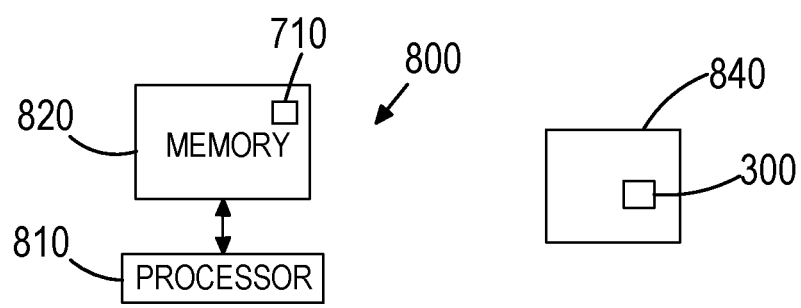
FIG. 12A illustrates an example of a controller.

As illustrated in FIG. 12A the controller 800 may be implemented using instructions that enable hardware functionality, for example, by using executable computer program instructions 710 in a general-purpose or special-purpose processor 810 that may be stored on a computer readable storage medium (disk, memory etc) to be executed by such a processor 810.

The processor 810 is configured to read from and write to the memory 820. The processor 810 may also comprise an output interface via which data and/or commands are output by the processor 810 and an input interface via which data and/or commands are input to the processor 810.

The memory 820 stores a computer program 710 comprising computer program instructions (computer program code) that controls the operation of all or part of a phase-compensated correlator 300 when loaded into the processor 810. The computer program instructions, of the computer program 710, provide the logic and routines that enables the apparatus to perform the methods illustrated in FIGS. 3 to 19 The processor 810 by reading the memory 820 is able to load and execute the computer program 710.

An apparatus comprising the controller may therefore comprise:
at least one processor 810; and at least one memory 820 including computer program code 710 the at least one memory 820 and the computer program code 710 configured to, with the at least one processor 810, cause the apparatus at least to perform causation of one, some or all the methods described above or performance of one, some or all of the methods described above.

As illustrated in FIG. 12B, the computer program 710 may arrive at the apparatus 800 via any suitable delivery mechanism 700. The delivery mechanism 700 may be, for example, a non-transitory computer-readable storage medium, a computer program product, a memory device, a record medium such as a compact disc read-only memory (CD-ROM) or digital versatile disc (DVD) or solid state memory, an article of manufacture that tangibly embodies the computer program 710. The delivery mechanism may be a signal configured to reliably transfer the computer program 710. The apparatus 800 may propagate or transmit the computer program 710 as a computer data signal.

Although the memory 820 is illustrated as a single component/circuitry it may be implemented as one or more separate components/circuitry some or all of which may be integrated/removable and/or may provide permanent/semi-permanent/dynamic/cached storage.

Although the processor 810 is illustrated as a single component/circuitry it may be implemented as one or more separate components/circuitry some or all of which may be integrated/removable. The processor 810 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 13:
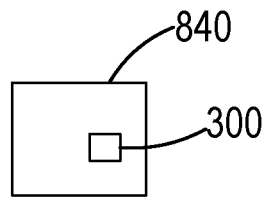
FIG. 13 illustrates an example of a chip-set.

As illustrated in FIG. 13, a chip set 840 may be configured to provide functionality of the controller 800, for example, it may provide all or part of a phase-compensated correlator 300.

The blocks illustrated in the FIGS. 3 to 19 may represent steps in a method and/or sections of code in the computer program 710. The illustration of a particular order to the blocks does not necessarily imply that there is a required or preferred order for the blocks and the order and arrangement of the block may be varied. Furthermore, it may be possible for some blocks to be omitted.

The components of an apparatus or system required to perform one or more of the before described methods, the before described blocks and or all or part of a phase-compensated correlator 300, need not be collocated, and data may be shared between components via one or more communication links.

Figure 14A:
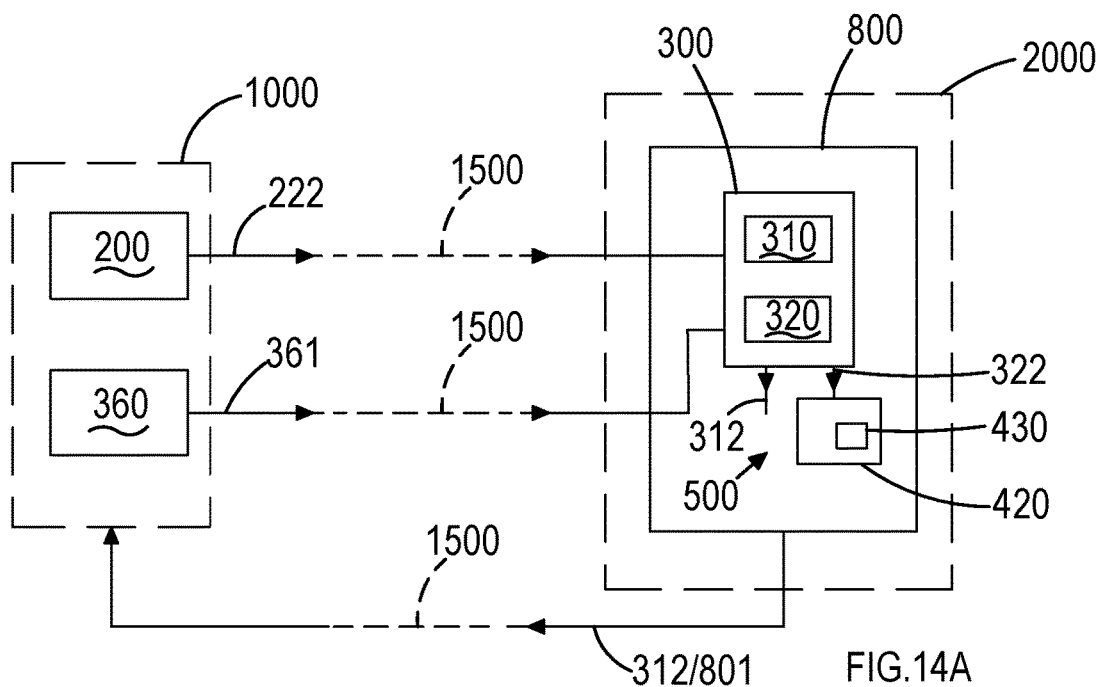
FIGS. 14A, 14B, 14C illustrates examples of a system, comprising a remote device and a remote processing system, that have different distributions of functions between the remote device and the remote processing system.

FIG. 14A illustrates one example of a system comprising a remote device 1000 and a remote processing system 2000. The remote device 1000 comprises the receiver 200 and the phase parameter module 360. The phase parameter module 360 provides the parameter information 361 to the remote processing system 2000. In this example, the phase parameter module 360 is a receiver-motion module 360 comprising receiver-motion sensors that provide receiver-motion sensor data (movement signal) as the parameter information 361. The remote device 1000 is physically distant from the remote processing system 2000 comprising the controller 800. The remote device 1000 and the remote processing system 2000 communicate via communications link(s) 1500. The communications link(s) 1500 may comprise of, for example, wireless communications (e.g. WiFi, BLE, Cellular Telephony, Satellite comms), cabled communications (e.g. Ethernet, landline telephone, fibre optic cable), physical storage media that may be transported between components (e.g. solid state memory, CD-ROM) or any combination thereof.

The digital signal 222 is provided by the remote device 1000 to the remote processing system 2000 via the communications link(s) 1500. The receiver-motion sensor data is provided as parameter information 361 by the remote device 1000 to the remote processing system 2000 via the communications link(s) 1500.

The controller 800 of the remote processing system 2000 comprises the phase-compensated correlator 300 comprising the correlator 310 and the phase-compensated correlation sequence generator 320.

The phase-compensated correlation sequence generator 320 generates the phase-compensated correlation sequence 322 from processing of the parameter information 361, and the correlator 310 performs phase-compensated correlation of the digital signal 222 using the phase-compensated correlation sequence 322 to produce correlation result 312.

The phase-compensated correlation sequence 322 may optionally be stored by a phase-compensated correlation sequence storage system 420 in an addressable memory 430 of the remote processing system 2000 for re-use.

In some but not necessarily all examples, the correlation result 312 is returned to the remote device 1000 via the communications link(s) 1500.

In some but not necessarily all examples, the phase-compensated correlation sequence 322 is returned to the remote device 1000 via the communications link(s) 1500.

In some but not necessarily all examples, the controller 800 performs additional post-processing of the correlation results 312 to derive higher-value outputs 801 (e.g. GNSS pseudoranges or position fixes from GNSS signals) that are transferred to the remote device 1000 via communications link(s) 1500.

Figure 14B:
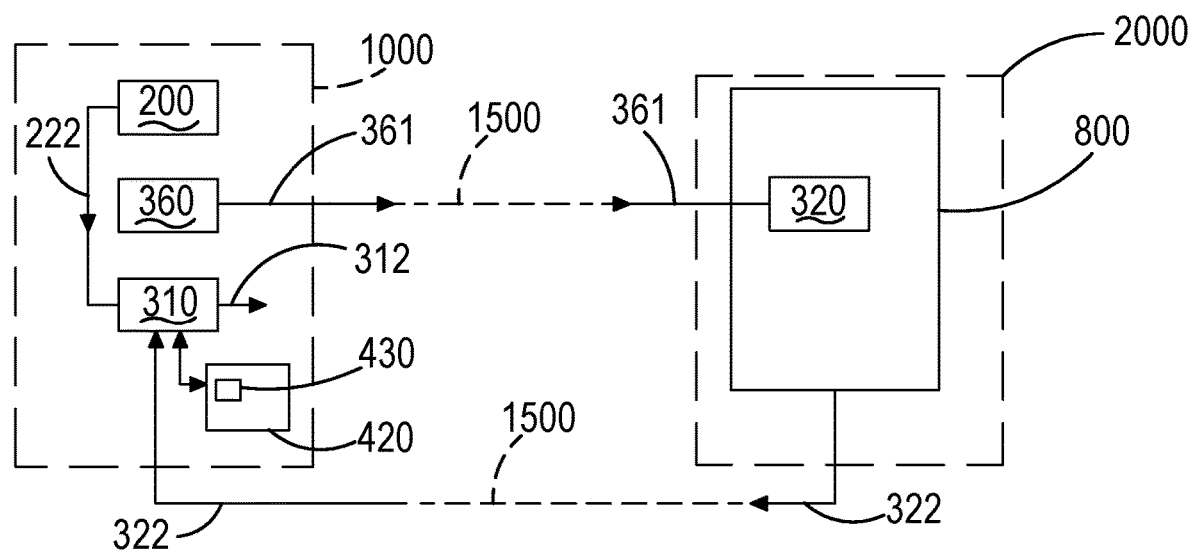

FIG. 14B illustrates another example of a system comprising a remote device 1000 and a remote processing system 2000. The remote device 1000 comprises the receiver 200 and the phase parameter module 360. The phase parameter module 360 provides the parameter information 361 to the remote processing system 2000. In this example, the phase parameter module 360 is a receiver-motion module 360 comprising receiver-motion sensors that provide receiver-motion sensor data (movement signals) as the parameter information 361. The remote device 1000 is physically distant from the remote processing system 2000 comprising the controller 800. The remote device 1000 and the remote processing system 2000 communicate via communications link(s) 1500. The communications link(s) 1500 may comprise of, for example, wireless communications (e.g. WiFi, BLE, Cellular Telephony, Satellite comms), cabled communications (e.g. Ethernet, landline telephone, fibre optic cable), physical storage media that may be transported between components (e.g. solid state memory, CD-ROM) or any combination thereof.

The receiver-motion sensor data is provided as parameter information 361 by the remote device 1000 to the remote processing system 2000 via the communications link(s) 1500.

Part of the phase-compensated correlator 300 (correlator 310) is in the remote device 1000 and part (phase-compensated correlation sequence generator 320) is in the remote processing system 2000.

The phase-compensated correlation sequence generator 320 in the remote processing system 2000 generates a phase-compensated correlation sequence 322 from processing of the received parameter information 361. The phase-compensated correlation sequence 322 is transferred from the remote processing system 2000 to the remote device 100 via the communications link(s) 1500.

The digital signal 222 is not provided by the remote device 1000 to the remote processing system 2000 via the communications link(s) 1500. Instead it is provided to the correlator 310 in the remote device 1000. The correlator 310 performs phase-compensated correlation of the digital signal 222 using the transferred phase-compensated correlation sequence 322 to produce correlation result 312.

At the remote device 1000, the phase-compensated correlation sequence 322 may optionally be stored by a phase-compensated correlation sequence storage system 420 in an addressable memory 430 of the remote device 1000 for re-use.

In a variation of the above described examples, the receiver-motion module 360 may be configured to process the receiver-motion sensor data to derive a measured or assumed receiver-motion value that is provided as parameter information 361. This processed parameter information 361 may be passed to the remote processing system 2000 instead of the raw receiver-motion sensor data, removing the need for the remote processing system 2000 to calculate the receiver-motion from the receiver-motion sensors data.

In a variation of the above described examples, the receiver-motion module 360 may not be located at the remote device 1000, but may be located elsewhere, for example, at the remote processing system 2000 or elsewhere.

Figure 14C:
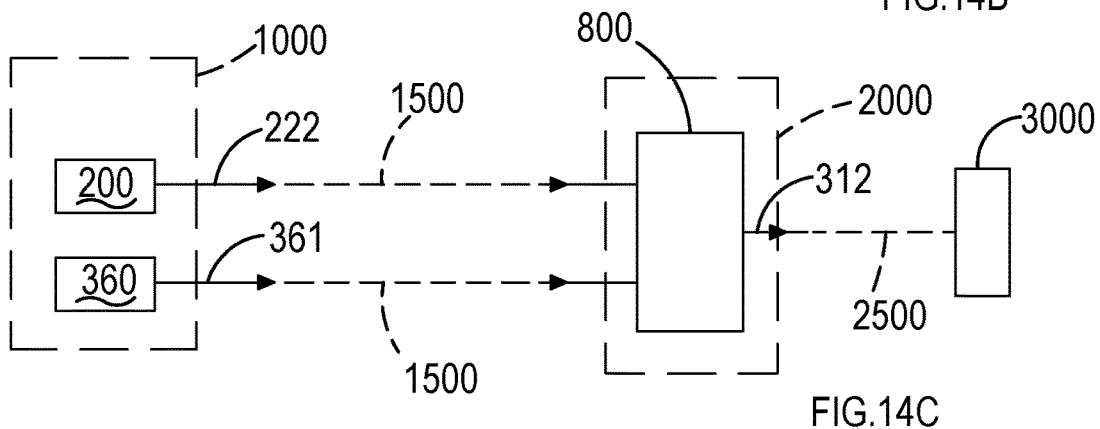

FIG. 14C illustrates another example of a system comprising a remote device 1000 and a remote processing system 2000. This system is similar to that illustrated in FIG. 14A, however, the correlation results 312 (and/or higher value outputs 801) are not provided to the remote device 1000. The correlation results 312 (and/or higher value outputs 801) are utilised/stored at the remote processing system 2000, or are provided to remote third-party clients 3000 via communications link(s) 2500 for further use/processing/storage.

It should be understood that the above examples may be further modified to include a plurality of remote devices 1000, and/or a plurality of remote processing systems 2000 and/or a plurality of remote third party clients 3000, all connected by a plurality of communications links 1500/2500.

The receiver 200 and the phase-compensated correlator 300 previously described and illustrated may, for example, be used for GNSS systems, radio systems (e.g. OFDM, DVB-T, LTE), sonar systems, laser systems, seismic systems etc. The term 'causing or performing' as it appears in the claims may mean to cause but not perform, to perform but not cause or to cause and perform. If an entity causes an action it means removal of the entity would mean that the action does not occur. If an entity performs an action the entity carries out the action.

The interconnection of items in a Figure indicates operational coupling and any number or combination of intervening elements can exist (including no intervening elements).

Where a structural feature has been described, it may be replaced by means for performing one or more of the functions of the structural feature whether that function or those functions are explicitly or implicitly described.

As used here 'hardware module' refers to a physical unit or apparatus that excludes certain parts/components that would be added by an end manufacturer or a user. A phase-compensated correlator 300 may be a hardware module. A phase-compensated correlation sequence generator 320 may be or may be part of a hardware module. A phase-compensated phasor generator 330 may be or may be part of a hardware module. A correlation code generator 340 may be or may be part of a hardware module. A phase parameter module 360, for example a receiver-motion module 360 may be or may be part of a hardware module. A correlator 310 may be or may be part of a hardware module. A phase-compensated correlation sequence storage system may be or may be part of a hardware module.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

It may be desirable to remove data modulation from the signal (called "data wipe-off" in GNSS terms), which, for example for a binary-phase-shift-keying (BPSK) modulation is done by applying a +/−π phase shift for each sample. The term phase compensation implies that the compensated phase can be one of multiple values not limited to +/−π. The absence (or presence) of phase compensation does not therefore prevent data wipe-off.

It may be desirable to use more than one correlator for correlation of concatenated correlation code words. It is important that phase coherency is maintained between correlators such that the start phase of a correlator corresponds to the end phase of the immediately preceding correlator and the end phase of the correlator corresponds to the start phase of the immediately following correlator.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A method for performing signal correlation for a signal processing system, comprising:
receiving a plurality of signals from a plurality of remote sources;
generating a plurality of local signals;
correlating one or more of the local signals with the plurality of received signals to generate a plurality of first correlation results;
determining motion of at least a portion of the signal processing system;
compensating a phase of at least one of the local signals, the received signals, and the first correlation results based on a plurality of first hypotheses regarding the determined motion to generate a plurality of first phase-compensated correlation results;
combining the plurality of first phase-compensated correlation results to generate a first joint correlation score;
determining a preferred first hypothesis in the plurality of hypotheses that maximizes the first joint correlation score;
correlating one or more of the local signals with the plurality of received signals to generate a plurality of second correlation results;
compensating a phase of at least one of the local signals, the received signals, and the second correlation results based on the preferred first hypothesis and a plurality of second hypotheses regarding at least one system parameter to generate a plurality of second phase-compensated correlation results;

combining the plurality of second phase-compensated correlation results to generate a second joint correlation score;

determining a preferred second hypothesis in the plurality of second hypotheses that maximizes the second joint correlation score; and using the preferred second hypothesis to estimate a value of a parameter associated with the signal processing system.

2. The method of claim 1, wherein the parameter comprises a frequency-related parameter.

3. The method of claim 2, wherein the frequency-related parameter comprises frequency, frequency evolution, or frequency and frequency evolution.

4. The method of claim 3, wherein the frequency-related parameter is defined by an n-order polynomial, where n has a value that is greater than or equal to 2.

5. The method of claim 2, wherein the frequency-related parameter comprises a frequency of a local oscillator signal used to control a phase of the local signal.

6. The method of claim 1, wherein the plurality of remote sources is a plurality of Global Navigation Satellite System (GNSS) satellites.

7. An apparatus for performing signal correlation within a signal processing system, comprising at least one processor and at least one non-transient computer-readable medium for storing instructions that, when executed by the at least one processor, cause the apparatus to perform operations comprising:

receiving a plurality of signals from a plurality of remote sources;

generating a plurality of local signals;

correlating one or more of the local signals with the plurality of received signals to generate a plurality of first correlation results;

determining motion of at least a portion of the signal processing system;

compensating a phase of at least one of the local signals, the received signals, and the first correlation results based on a plurality of first hypotheses regarding the determined motion to generate a plurality of first phase-compensated correlation results;

combining the plurality of first phase-compensated correlation results to generate a first joint correlation score;

determining a preferred first hypothesis in the plurality of hypotheses that maximizes the first joint correlation score;

correlating one or more of the local signals with the plurality of received signals to generate a plurality of second correlation results;

compensating a phase of at least one of the local signals, the received signals, and the second correlation results based on the preferred first hypothesis and a plurality of second hypotheses regarding at least one system parameter to generate a plurality of second phase-compensated correlation results;

combining the plurality of second phase-compensated correlation results to generate a second joint correlation score;

determining a preferred second hypothesis in the plurality of second hypotheses that maximizes the second joint correlation score; and using the preferred second hypothesis to estimate a value of a parameter associated with the signal processing system.

8. The apparatus of claim 7, wherein the parameter comprises a frequency-related parameter.

9. The apparatus of claim 8, wherein the frequency-related parameter comprises frequency, frequency evolution, or frequency and frequency evolution.

10. The apparatus of claim 9, wherein the frequency-related parameter is defined by an n-order polynomial, where n has a value that is greater than or equal to 2.

11. The apparatus of claim 8, wherein the frequency-related parameter comprises a frequency of a local oscillator signal used to control a phase of the local signal.

12. The apparatus of claim 7, wherein the plurality of remote sources is a plurality of Global Navigation Satellite System (GNSS) satellites.

13. A non-transitory computer readable medium comprising instructions that when executed by a computer cause the computer to perform a method for performing signal correlation for a signal processing system, comprising:

receiving a plurality of signals from a plurality of remote sources; generating a plurality of local signals;

correlating one or more of the local signals with the plurality of received signals to generate a plurality of first correlation results;

determining motion of at least a portion of the signal processing system; compensating a phase of at least one of the local signals, the received signals, and the first correlation results based on a plurality of first hypotheses regarding the determined motion to generate a plurality of first phase-compensated correlation results;

combining the plurality of first phase-compensated correlation results to generate a first joint correlation score;

determining a preferred first hypothesis in the plurality of hypotheses that maximizes the first joint correlation score; correlating one or more of the local signals with the plurality of received signals to generate a plurality of second correlation results;

compensating a phase of at least one of the local signals, the received signals, and the second correlation results based on the preferred first hypothesis and a plurality of second hypotheses regarding at least one system parameter to generate a plurality of second phase-compensated correlation results;

combining the plurality of second phase-compensated correlation results to generate a second joint correlation score;

determining a preferred second hypothesis in the plurality of second hypotheses that maximizes the second joint correlation score; and using the preferred second hypothesis to estimate a value of a parameter associated with the signal processing system.

14. The non-transitory computer readable medium of claim 13, wherein the parameter comprises a frequency-related parameter.

15. The non-transitory computer readable medium of claim 14, wherein the frequency-related parameter comprises frequency, frequency evolution, or frequency and frequency evolution.

16. The non-transitory computer readable medium of claim 15, wherein the frequency-related parameter is defined by an n-order polynomial, where n has a value that is greater than or equal to 2.

17. The non-transitory computer readable medium of claim 14, wherein the frequency-related parameter comprises a frequency of a local oscillator signal used to control a phase of the local signal.

18. The non-transitory computer readable medium of claim 13, wherein the plurality of remote sources is a plurality of Global Navigation Satellite System (GNSS) satellites.

* * * * *